United States Patent
Oshima

(10) Patent No.: US 6,194,885 B1
(45) Date of Patent: Feb. 27, 2001

(54) BOOSTING ACTIVE FILTER SYSTEM AND CONTROLLER FOR BOOSTING ACTIVE FILTER

(75) Inventor: Seiichi Oshima, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/508,699
(22) PCT Filed: Sep. 30, 1997
(86) PCT No.: PCT/JP97/03493
§ 371 Date: Mar. 30, 2000
§ 102(e) Date: Mar. 30, 2000
(87) PCT Pub. No.: WO99/17434
PCT Pub. Date: Apr. 8, 1999

(51) Int. Cl.[7] .................... G05F 1/40; H02H 7/10
(52) U.S. Cl. ............... 323/285; 323/286; 363/39; 363/50
(58) Field of Search ........................ 323/222, 225, 323/283, 284, 285, 286; 363/39, 45, 46, 47, 41, 50, 52, 53, 55, 56

(56) References Cited

U.S. PATENT DOCUMENTS 5,793,623 * 8/1998 Kawashima et al. ............... 363/56
5,912,552 * 6/1999 Tateishi ............................. 323/285

FOREIGN PATENT DOCUMENTS 7-89743    9/1995  (JP).
8-19259    1/1996  (JP).

* cited by examiner

Primary Examiner—Jessica Han
(74) Attorney, Agent, or Firm—Oblon, Spivak, McClelland, Maier & Neustadt, P.C.

(57) ABSTRACT

A control for controlling the DC output voltage of a boosting active filter constant. When a load changes from a rated condition to a light load or a no-load condition and the output voltage rises, a conventional active filter control device externally forces the active filter to stop and restart to suppress the voltage rise. In this process, an excessive inrush current occurs and the reactor produces abnormal sound. In addition, the conventional technique cannot be adapted to the PAM control. Accordingly, in the disclosed control of an active filter, first and second resistors and a control power supply are provided between an output terminal of a main circuit and ground, and the voltage at a node is input to one input end of a first differential amplifier and one input end of a hysteresis comparator. The output of the comparator is connected to an output end of a second differential amplifier through a signal line. The voltage at the node is kept equal to a reference voltage even if the output voltage set value is changed by changing the control voltage of the power supply, thus providing an overvoltage protection function which can follow variation of the output voltage set value. Such an active filter can be applied to a load such as a PAM-controlled inverter, AC servomotor, etc.

18 Claims, 15 Drawing Sheets

F I G. 1
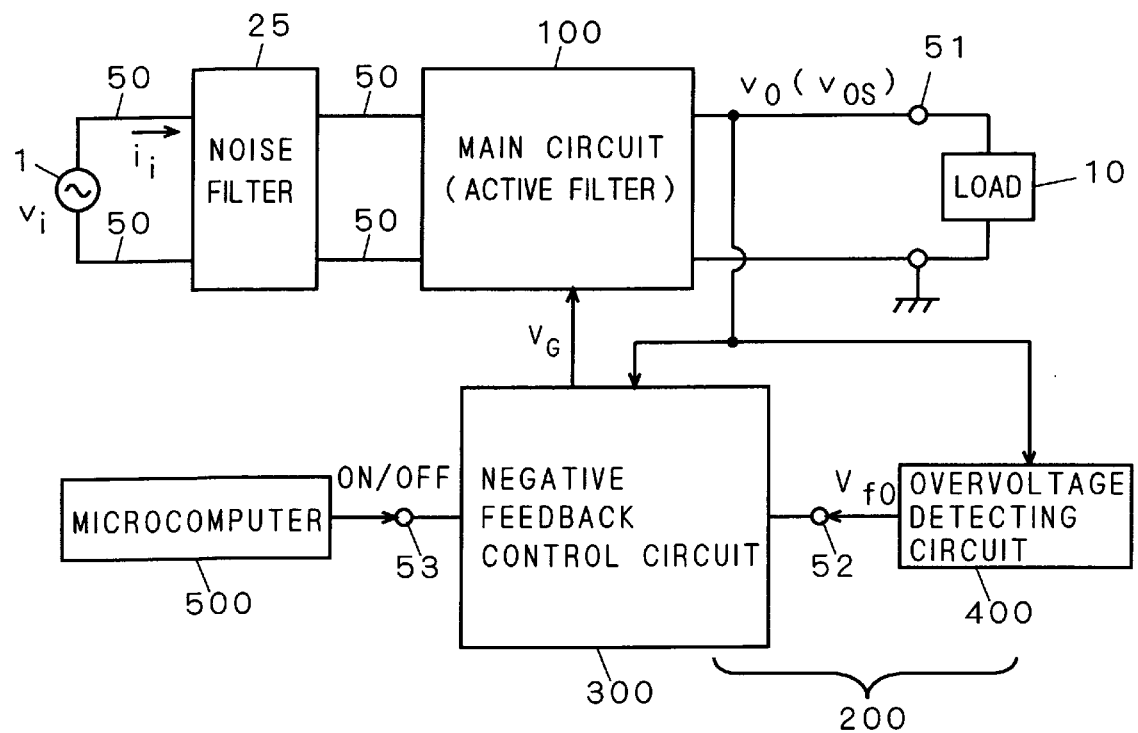

F I G. 6
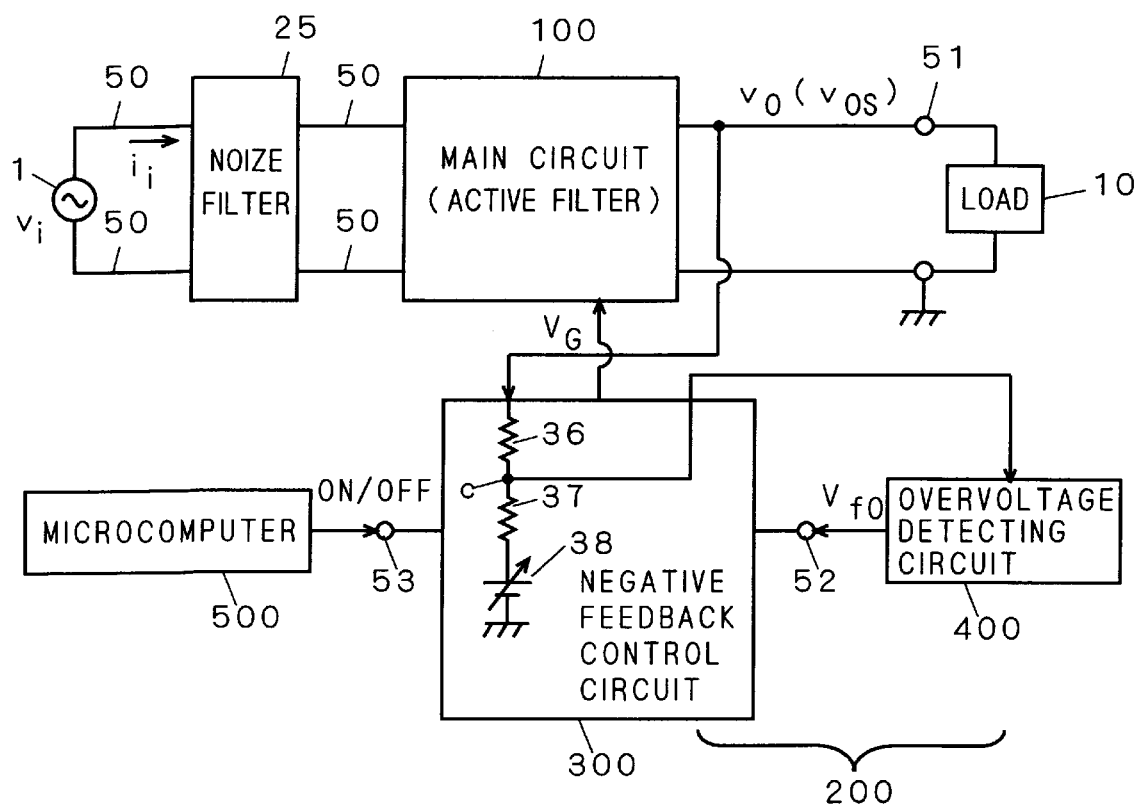

F I G. 13
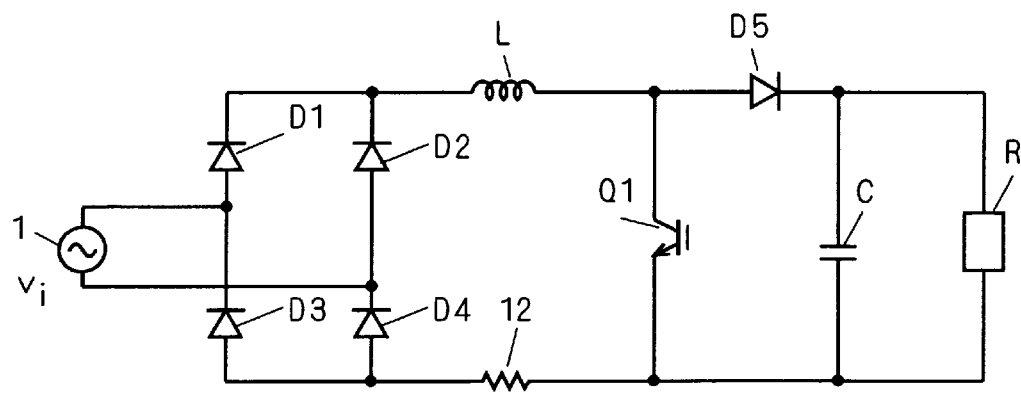

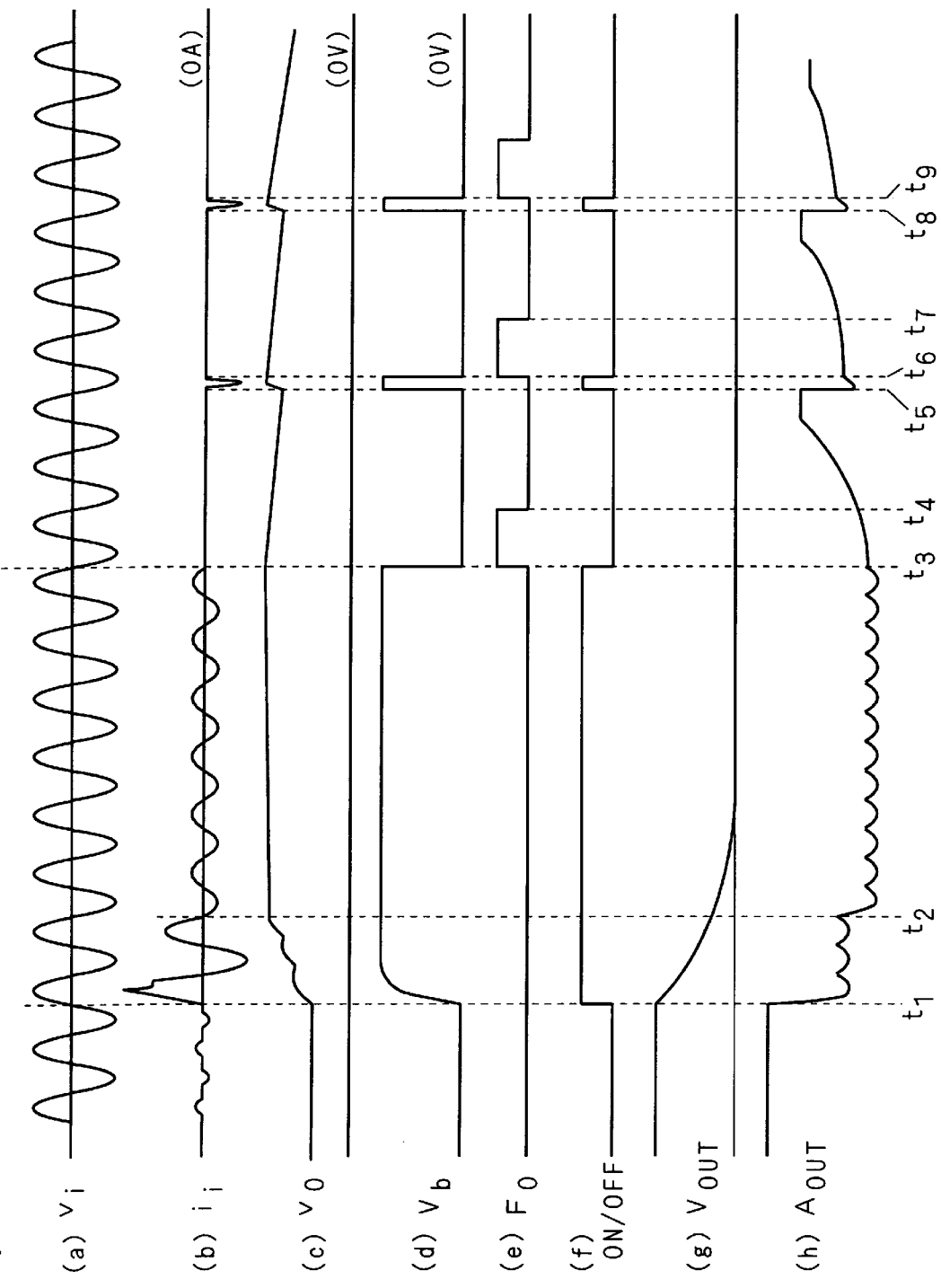

BOOSTING ACTIVE FILTER SYSTEM AND CONTROLLER FOR BOOSTING ACTIVE FILTER

BACKGROUND OF THE INVENTION

1. Field of the Invention

The present invention relates to a system technique which utilizes a boosting active filter which functions as a DC power-supply circuit for a load, and a technique for controlling the active filter.

(1) First, the present invention relates to a system which uses a boosting active filter as an AC-DC converter or a DC-DC converter which provides (a) control of DC output voltage, (b) power-factor improvement of the power supply, and (c) a measure to counter power-supply harmonics, and a device for controlling the active filter.

More specifically, the present invention relates to a technique which is used for such an active filter to certainly limit the variation of the DC output voltage within a given range around the set value over the entire load range including a situation in which the load condition largely changes from the no-load or light load to the rated load or heavy load and the opposite situation.

(2) The present invention further relates to a system for supplying a DC output voltage to the load by using a boosting active filter as an AD-DC converter or a DC-DC converter which provides (a) control of variable DC output voltage, (b) power-factor improvement of the power supply, and (c) a measure to counter power-supply harmonics, and a device for controlling the active filter.

More specifically, the present invention relates to a boosting active filter system having an overvoltage preventing control function which can certainly control a variable DC output voltage within a given range around a certain set value over the entire load range including a situation in which the load condition largely changes from the light load or no-load to the rated load or heavy load and the opposite situation, and which can follow a new set voltage even if the set voltage is changed, and to a device for controlling the active filter.

2. Discussion of the Background

The basic circuit configurations of the boosting active filters have conventionally been studied and known. For example, Japanese Patent No.2624793 (Japanese Patent Publication No.7-89743) discloses a basic circuit configuration thereof. FIG. 13 shows the structure of the main circuit corresponding to the basic circuit.

As shown in FIG. 13, the main circuit includes converter diodes D1 to D2 forming a full-wave rectifying circuit, a DC reactor L, a switching element Q1, a rectifier diode D5, a load capacitor C, and a load R.

Some methods for controlling this main circuit have also been suggested and used in practice. Many ICs specialized to realize the control systems are commercially available. FIG. 14 shows an example of circuit configuration of the entirety of an actually used active filter system.

As shown in FIG. 14, this system generally includes a single-phase AC power supply 1, a noise filter 25, a main circuit (active filter) 100, a control circuit 200P for controlling the main circuit 100, and a load 10. Among these components, the main circuit 100 includes diodes 2 to 5 forming a single-phase full-wave rectifying circuit, a reactor 6, a switching element 7, a rectifier diode 9, a load capacitor 11 connected to the load 10 in parallel, and a current detecting resistor 12. The control circuit 200P includes resistors 29 to 32 for dividing the DC output voltage $v_o$, a voltage setter 13 for indicating a set value of the load voltage, a voltage amplifier (a differential amplifier) 14 for amplifying the difference between the load voltage and the voltage set value, and a multiplier 15 receiving a current obtained by applying full-wave rectification to the AC power-supply current at its one input and an output from the voltage amplifier 14 at its other input, for calculating and outputting the product.

The control circuit 200P further includes a current amplifier 16 for amplifying the difference between the AC power-supply current detected by the current detecting resistor 12 and the output from the multiplier 15, an oscillator 17 for generating a signal having a triangular waveform, and a comparator 18 having its one input connected to the output of the oscillator 17 and its other input connected to the connection point "a" between a constant-current source 26 and the anode of a diode 28 having its cathode connected to the output of the current amplifier 16.

The comparator 18 makes comparison between its two input signals to output a control signal at a given frequency, whose waveform has a duty factor varying in accordance with the result of the comparison. The control signal is amplified by a gate driver 19 and then applied to the gate electrode of the switching element 7, and the switching element 7 turns on and off in correspondence with the duty factor of the control signal.

When the switching element 7 is on, the current inputted from the AC power supply I flows in the closed circuit including the rectifier diodes 2 to 5, the reactor 6, the switching element 7 and the current detecting resistor 12. After that, when the switching element 7 turns off, the current flowing through the reactor 6 cannot flow to the switching element 7, and it flows to the load 10 and the load capacitor 11 parallel-connected to the load 10 through the rectifier diode 9. Then the load capacitor 11 is charged and the DC output voltage or load voltage $v_o$ rises. As a result, in the period in which the switching element 7 is in the OFF state, the rectifier diode 9 is reverse-biased by the charge voltage of the load capacitor 11 and the current does not flow. Thus, in the OFF period of the switching element 7, electric charge is discharged from the load capacitor 11 to the load 10 and current is supplied to the load 10.

The control circuit 200P further includes a soft start DC power supply 23 which directs the main circuit to make soft start immediately after an activation command signal ON is inputted and activation after the soft start, and a start switch 22 which connects the DC power supply 23 to the cathode of the diode 27 series-connected to the constant-current source 26 in response to the input of the activation command signal ON. When the start switch 22 operates to apply the power-supply voltage of the soft start DC power supply 23 to the point "b," the control circuit 200P and therefore the entire system including the active filter is started. To stop the entire system, an activation stop command signal OFF is applied to control the start switch 22 to the ground potential.

The control circuit 200P also has a hysteresis comparator 20 for the object described later; when the voltage obtained by dividing the DC output voltage $v_o$ at the resistors 31 and 32 exceeds an overvoltage determining reference level (trip operation point) determined by the set value 24, the comparator 20 outputs an overvoltage detect signal to a flip-flop 21 to latch the flip-flop 21. In response, an overvoltage detect signal $F_o$ is outputted to the outside.

When detecting the output of the signal $F_o$, an external microcomputer 500 generates the activation stop command signal OFF and sends it to the start switch 22 to switch the start switch 22 to the ground potential.

In this way, the conventional system is constructed so that the entire system is stopped by external control when the voltage obtained by dividing the DC output voltage across the load terminals at the two resistors 31 and 32 rises to or over a level corresponding to the overvoltage (the trip operation point).

In this conventional circuit, when the load 10 changes from the rated heavy load condition to the light load or no-load condition, the output voltage $v_o$ of the active filter rises higher and higher by the mechanism described below over the range in which the output voltage can be controlled constant.

The "heavy load condition" means a condition in which the load operates while satisfying the 100% condition with respect to the rating, and the "light load condition" is defined as a condition in which the load operates in 5% to 10% condition with respect to the rating. The "no-load condition" corresponds to 0% of the rating.

The rise of the output voltage $v_o$ of the active filter causes the problem of deteriorating the performance of the load capacitor 11 (e.g. an electrolytic capacitor) on the basis of the relation between the rise value and the breakdown voltage of the load capacitor 11 connected between the output terminals.

For a countermeasure, the system adopts the method in which the output voltage is detected and, when the output voltage rises to an overvoltage being more than or equal to a certain constant value, the control circuit itself is forced to the OFF state by an external microcomputer to stop the active filter operation so as to hinder the rise of the output voltage. The overvoltage detecting circuit shown in FIG. 14 corresponds to the portion for realizing this system, which includes the hysteresis comparator 20, the flip-flop 21, and the two resistors 31 and 32.

Now the mechanism in which the output voltage $v_o$ gradually rises in the light load or no-load condition will be described in detail.

In the circuit diagram FIG. 14 showing the conventional active filter system, the frequency of the oscillator 17 is selected to about 10 kHz to 50 kHz. It is determined on the basis of the switching capability of the switching element 7 and the frequency characteristic of the reactor 6. In FIG. 3, (A) shows an example of the output waveform of the oscillator 17. In (A) of FIG. 3, the oscillation frequency is 20 kHz, and therefore the period is 50 μs. The oscillator 17 itself is designed so that its triangular wave has a valley voltage (a first level) at 2.0 V and a peak voltage (a second level) at 3.0 V.

This triangular-wave output signal is supplied as one input to the comparator 18 as stated before. The connection point a between the diode 28 connected to the output end of the current amplifier 16 and the consltant-current source 26 is connected to the other input to the comparator 18, and the comparator 18 changes the duty factor of the control signal, which gives the ratio between the ON time and the OFF time of the switching element 7, according to a comparison between them. That is to say, when the potential at the connection point a is 2.0 V, the comparator 18 sets the duty factor of the control signal at 0%. When the potential at the connection point a is 3.0 V, the comparator 18 outputs a control signal whose waveform has a duty factor of 100%.

FIG. 4 shows the characteristic of the comparator 18. As shown in FIG. 4, as the potential at the connection point a varies in the range of 2.0 V to 3.0 V, and therefore as the potential $A_{OUT}$ at the output end of the current amplifier 16 varies in the range of 1.4 V to 2.4 V, since the forward drop voltage of the diodes 27 and 28 are both 0.6 V, then the comparator 18 outputs the control signal having a waveform whose duty factor linearly changes in the range of 0% to 100%. In this case, when the duty factor is 0%, the ratio of the ON time of the switching element 7 to one period of the output wave of the oscillator 17 is 0%, and when the duty factor of the control signal is 100%, the ratio of the ON time of the switching element 7 is 100%.

In FIG. 3, (B) is a diagram showing the waveform of the potential at the connection point a exhibited when the load 10 is in the heavy load condition, with respect to the triangular voltage waveform of the oscillator 17 shown in (A) of FIG. 3. That is to say, (B) in FIG. 3 shows the potential waveform at the connection point a exhibited when the triangular wave of the oscillator 17 has the peak voltage of 3.0 V, the valley voltage of 2.0 V, and the frequency of 20 kHz.

As shown in (B) of FIG. 3, since (1) the waveform at one input end of the multiplier 15 captures the AC power-supply voltage through the voltage drop at the resistor 33 and (2) the output waveform of the current detecting resistor 12 is similar to the power-supply waveform of the AC power supply 1, the potential at the connection point a or the output $A_{OUT}$ of the current amplifier 16 also shows a waveform similar to the full-wave rectified waveform of the AC power supply 1. Accordingly, in the heavy load condition, the peak voltage at the connection point a is 3.0 V and the valley voltage is 2.5 V. Hence the comparator 18 generates the control signal having a waveform with a 100% duty factor when the voltage at the connection point a is at the peak voltage 3.0 V, and it generates the control signal having a waveform with a 50% duty factor when the voltage at the connection point a is at the valley voltage 2.5 V. In this case, as the potential at the connection point a varies in the range of 3.0 V to 2.5 V in the half-wave period of the power-supply voltage (which is 10 ms when the frequency of the AC power supply 1 is 50 Hz), the duty factor of the control signal outputted from the comparator 18 varies in the range of 100% to 50% in this half-wave period (the control signal varies between the ON level and the OFF level at the same frequency as the oscillation output of the oscillator 17). As a result, the ratio between the ON time and the OFF time of the switching element 7 also varies in accordance with the variation of the duty factor of the control signal.

In this way, in the heavy load condition, the period of the ON operation of the switching element 7 is set long so that larger energy can be stored in the reactor 6, and the energy is discharged to the output side in the OFF period of the switching element 7 to increase the charge voltage of the load capacitor 11. This operation controls the output voltage constant in the heavy load condition.

On the other hand, in FIG. 3, (C) is a diagram showing the voltage waveform at the connection point a in the light load or no-load condition is shown. The output waveform of the oscillator 17 varies as shown in (A) of FIG. 3. In this case, both the valley voltage and the peak voltage of the voltage waveform at the connection point a show values slightly larger than 2.0 V. This is because of the following reason. That is to say, when the DC output voltage rises to the set value and the load 10 changes from the heavy load condition to the no-load or light load condition, the output of the voltage amplifier 14 indicates 0 V and then the multiplier 15 operates to minimize its output, which causes the current amplifier 16 to output an output signal at such a level that the voltage at the connection point a becomes as close to the valley voltage 2.0 V of the triangular wave of the oscillator 17 as possible (which is a value near 1.4 V). As a result, the comparator 18 operates to cause the DC output voltage to be constant. However, the duty factor of the control signal does not become perfectly 0% but it attains the minimum duty factor, and the comparator 18 performs ON/OFF operation with this minimum duty factor and outputs the control signal. Since the switching element 7 turns on/off in response to it, a small current is supplied to the load 10 and the load capacitor 11. If the current value is larger than or equal to the current value that the load 10 requires in the light load or no-load condition, the extra current corresponding to the difference keeps charging the load capacitor 11 and the output voltage $v_o$ gradually rises. With this voltage rise, the output voltage rises over the level value at which the load voltage can be controlled constant. If this voltage rise is left as it goes, the output voltage continues rising, and finally the output voltage $v_o$ exceeds the breakdown voltage of the load capacitor 11 and deteriorates the performance of the load capacitor 11. Accordingly, as stated above, when the output voltage becomes a level set as the overvoltage or above, the conventional circuit shown in FIG. 14 detects this state and an external device recognizes the occurrence of the abnormality, and the activation stop command from outside puts the active filter and its control circuit perfectly in the OFF state to prevent the above-described problem in advance.

The above-described function is originally a protective function against abnormal operation. However, in practice, the load 10 is very likely to come in the light load or no-load condition. For example, suppose that the load 10 is an inverter in a household air conditioner; when the temperature in the room which the air conditioner controls becomes lower than the set temperature, for example, the air conditioner stops the compressor and realizes the no-load condition so as to decrease the room temperature. This operation frequently occurs. Recognizing this frequent phenomenon as abnormal operation every time introduces a serious problem. It is therefore desired that the output voltage of the active filter can be always controlled constant even when the load comes in the light load or no-load condition.

As described above, the load 10 frequently comes in the light load or no-load condition. However, in the conventional technique, it is each time recognized as an abnormality and the active filter is completely stopped. This is very inconvenient to use as a control method.

The timing chart of FIG. 15 shows waveforms obtained by reviewing the operation of the individual portions of the conventional circuit shown in FIG. 14. In (a) of FIG. 15, a character $v_i$ shows the voltage waveform of the AC power supply 1. A character $i_i$ in (b) of FIG. 15 shows the current waveform coming from the AC power supply 1. The waveform obtained by full-wave rectifying the AC current $i_i$ is represented as a voltage in the current detector 12. A character $v_o$ in (c) of FIG. 15 shows the output voltage waveform across the output terminals of the active filter. A character ON/OFF in (f) of FIG. 15 shows ON/OFF operation of the start switch 22, and the voltage waveform at the point b in FIG. 14 is shown as the voltage $V_b$ in (d) of FIG. 15. A character $V_{OUT}$ in (g) of FIG. 15 shows the output waveform of the voltage amplifier 14, and a character $A_{OUT}$ in (h) of FIG. 15 shows the output waveform of the current amplifier 16.

As shown in FIG. 15, when the start switch 22 operates into the ON state at time $t_1$, the soft start DC power supply 23 is connected to the diode 27. Then the potential $V_b$ at the connection point b rises as shown in (d) of FIG. 15 and the current flows to the diode 28 from the constant-current source 26 accordingly, and then the comparator 18 and the gate driver 19 start driving and the switching element 7 turns on. At first, the load capacitor 11 is charged with a voltage corresponding to the peak value of the power-supply voltage of the AC power supply 1. When the voltage set value in the voltage setter 13 is sufficiently higher than the peak value of the power-supply voltage of the AC power supply 1, the comparator 18 outputs the control signal whose waveform has a duty factor of almost 100% to turn on the switching element 7. As a result, a large AC current flows and the load capacitor 11 is rapidly charged.

When the charge voltage at the load capacitor 11 reaches the voltage set value at time $t_2$, the negative feedback control of the control circuit 200P causes the value of the AC power-supply current $i_i$ to rapidly attenuate from the large current value to a current value required by the load 10. At this time, if the load 10 is in the light load condition or the no-load condition, this AC power-supply current is controlled to the minimized value (lower than or equal to about 5% to 10% of the current in the heavy load condition) and the output $V_{OUT}$ of the voltage amplifier 14 falls from the maximum voltage toward 0 V.

Now, the voltage $V_b$ at the point b shows an AC waveform having its maximum at about 3.0 V (strictly 3.0 V–0.6 V). The output voltage $A_{OUT}$ of the current amplifier 16 shows an AC waveform having its peak voltage at about 2.4 V which is lower than the potential at the connection point a by the forward drop voltage of the diode 28 (0.6 V). However, since the voltage $V_{OUT}$ comes to a value close to 0 V as the output voltage $v_o$ reaches the voltage set value at time $t_2$, the voltage $A_{OUT}$ changes to a waveform similar to the AC full-wave rectified waveform having its valley voltage at about 1.4 V and the current amplifier 16 operates to minimize the ON time of the switching element 7. As a result, the current flowing to the output terminals of the active filter becomes smaller and the voltage of the load capacitor 11 gradually rises for the reason described above.

When the output voltage reaches the voltage set as the overvoltage at time $t_3$, the hysteresis comparator 20 operates and the flip-flop 21 operates to output the detect signal $F_o$ to the outside. With the output of the detect signal $F_o$, the external microcomputer 500 recognizes it as an abnormality and outputs the activation stop command signal OFF to turn off the start switch 22 so as to bring the potential $V_b$ at the point b to the ground potential. This stops the operation of the switching element 7 and the output voltage $v_o$ stops rising. After that, the load capacitor 10 discharges and the output voltage $v_o$ gradually decreases.

When the output voltage $v_o$ reaches the reset voltage of the hysteresis comparator 20 at time $t_5$, the comparator 20 is reset. After that, as the external microcomputer outputs the activation command signal ON to the start switch 22 again to turn on the switch 22, the main circuit 100 performs the active filter operation again.

However, in this case, the output voltage $A_{OUT}$ rises toward the original maximum level in time $t_3$ to $t_5$, that is, if the output voltage $A_{OUT}$ has risen to or above the condition in which the output of the comparator 18 shows the 100% duty factor waveform, then a large AC current $i_i$ flows again to the switching element 7 when the start switch 22 is turned on again (time $t_5$). If the load 10 is in the light condition at this time, the extra large current rapidly charges the load capacitor 11 and the output voltage $v_o$ exceeds the overvoltage set value again at time $t_6$, and then the hysteresis comparator 20 immediately operates. As the result, the detect signal $F_o$ is outputted from the flip-flop 21 again and the external microcomputer 500 detects this as an occurrence of an abnormality and controls the start switch 22 again to force the potential $V_b$ at the point b to drop to the ground potential, and the active filter 100 stops again for the occurrence of the abnormality. In this period (time $t_5$ to $t_6$), the excessive current flows to the reactor 6 as an inrush current, which may cause the reactor 6 to generate abnormal sound.

While this series of operations functions to quickly protect the load capacitor 111 from overvoltage, the procedure of restarting is required every time the active filter 100 and its control circuit 200P stop operation, and the overvoltage state immediately occurs every time the restarting operation is performed.

Furthermore, since this phenomenon occurs in a certain cycle, it is seriously recognized as abnormal sound, and the device is very defective as a product.

The above-described problems become more serious when combined with the following problem.

That is to say, while fixed voltage control may be required for the DC output voltage of the active filter, variable voltage control is increasingly demanded to apply PAM control (Pulse Amplitude Modulation) to an inverter serving as the load of the active filter. This is because the PAM control is enabling remarkable improvement of the efficiency of the entire control system including the active filter, the inverter, and the load motor of the inverter. Thus, (1) the active filter is required to have the function of allowing the DC output voltage to be variably set from outside. Further, it is also strongly demanded that (2) even when the set voltage is changed as stated above, the set voltage should be controlled constant within a given range over the entire load range from the light load or no-load to the rated load.

However, even when the output voltage has a fixed value, the conventional active filter described above cannot control the output voltage within a constant range without causing the above-described problems when the load changes to the light load or no-load condition. That is to say, actually, it is definitely impossible to satisfy the requirements (1) and (2) without encountering the problems.

The problems of the conventional circuit can be summarized as follows:

(First Problem)

First, granting it to be right that the active filter operation is stopped after the output voltage over the overvoltage set value is detected to control the output voltage in the constant range, recognizing the detection as an abnormality every time and stopping and starting the control circuit from outside renders the active filter very inconvenient for users from the viewpoint of controllability. When considering the situation in which the load changes from the heavy load condition to the light load or no-load condition, the phenomenon that the output voltage rises to the level of the overvoltage set value must be regarded as a frequently occurring phenomenon. It must be though over whether it is necessary to recognize this phenomenon as "occurrence of an abnormality" which causes the system to stop. We must change the way of conceiving in this sense.

(Second Problem)

The second problem is relevant to the first problem. That is to say, when the output voltage falls after the operation of the active filter is stopped and reaches the reset voltage, the conventional technique detects the state and restarts the active filter. We should note the problem that an excessive current flows at this time. This causes the reactor to generate abnormal sound. Furthermore, after the restart, the system soon comes in the overvoltage state again, and the system is caught in a vicious circle that the activation must be stopped again.

(Third Problem)

While the protective set value can be a fixed voltage value in respect of protection of the load capacitor from overvoltage, the DC output voltage of the active filter must be set freely to satisfy the demand of applying the PAM control to the load side.

We now consider whether this demand can be satisfied in the conventional circuit shown in FIG. 14. For example, suppose that the overvoltage protective set value has a fixed value of 400 V and the DC output voltage of the active filter can be controlled freely in the range of 200 V to 380 V by changing the set value in the circuit 13 shown in FIG. 14. In this case, when the output voltage is selected to 200 V, for example, and the load rapidly changes from the rated load to the light load or no-load, and then the DC output voltage rises from 200 V to 400 V and the overvoltage is detected. In this case, the control range of the output voltage is 200 V. For another example, when the set value of the DC output voltage is 300 V, the DC output voltage rises from 300 V to 400 V and the overvoltage is detected. In this case, the control range of the DC output voltage is 100 V. Such control is far from being a DC output type constant control.

As stated above, the conventional technique cannot solve even the third problem.

SUMMARY OF THE INVENTION

The present invention has been made to solve the above-described problems of the conventional circuit. That is to say, objects of the present invention can be summarized as follows.

1. A first object is to control the DC output voltage constant by automatically starting/stopping only the active filter without the need of external control to start/stop.

That is to say, in the invention, when the load rapidly changes into a light load or no-load condition, only the active filter operation is automatically stopped to suppress the rise of the DC output voltage within a certain voltage range, and then the normal active filter operation is automatically started again when the DC output voltage falls to a given control voltage (reset level) as the charge voltage of the load capacitor is discharged.

2. A second object is to stably control the DC output voltage within a given range without causing excessive current to occur when restarting the active filter operation. The present invention thus prevents generation of abnormal sound.

3. A third object is to enable the active filter system to be applied to the PAM control while satisfying the first and second objects above. That is to say, when the set value of the DC output voltage of the active filter is changed, the system follows the changed set value and stops only the active filter operation at a trip voltage higher than the set value by a given voltage and restarts only the active filter operation at a reset voltage higher than the set value by a given level, whereby the present invention can control the variation of the DC output voltage within an almost constant range despite the variation of the set value.

4. A fourth object is relevant to the third object, and it is to realize an active filter which is applicable to the PAM control and capable of performing further stable operation while controlling the DC output voltage within a narrower range, and to realize a system of the active filter.

5. A fifth object is to make the active filter satisfying the first to fourth objects above and its system applicable to the three-phase alternating current.

To achieve the first object, the present invention is realized as the first to eighteenth aspects shown below.

The second to fifth, and twelfth to eighteenth aspects of the invention achieve the second object.

The fourth, fifth, thirteenth, fourteenth, seventeenth, and eighteenth aspects achieve the third object.

The fifth, fourteenth, and eighteenth aspects achieve the fourth object, and the seventh aspect achieves the fifth object.

The present invention pays attention to the following point; as discussed referring to FIG. 15, when the output voltage $A_{OUT}$ of the current amplifier gradually rises after time $t_3$, the conventional circuit shown in FIG. 14 allows the output voltage $A_{OUT}$ to rise to such a level that the output waveform of the comparator exhibits the maximum 100% duty at the time $t_5$ of restarting. The inventor of the invention considers that this point is the source of the above-described problems of the conventional technique. Accordingly, the present invention adopts the aspects shown below to solve this point and achieves the first to fourth objects.

First, according to a first aspect of the invention, an active filter system comprises: a power supply; an input signal line for input of a power-supply voltage of the power supply; a load, and a main circuit having its input end connected to the input signal line and its output end connected to the load, converting the power-supply voltage to a DC voltage and outputting the DC voltage as an output voltage, wherein the main circuit comprises a full-wave rectifying circuit connected to the input signal line, a reactor having its first end connected to a first output end of the full-wave rectifying circuit, a rectifier diode having its anode electrode connected to a second end of the reactor and its cathode electrode connected to the output end of the main circuit, a load capacitor having its first end connected to the output end of the main circuit and its second end grounded, a switching element having its first main electrode connected to the second end of the reactor and its second main electrode connected to the second end of the load capacitor, performing ON operation when a control voltage applied to its control electrode is at an ON level and performing OFF operation when the control voltage is at an OFF level, and a current detecting resistor having its first end connected to the second main electrode of the switching element and its second end connected to a second output end of the full-wave rectifying circuit, and the active filter system further comprises: an overvoltage detecting circuit receiving a signal giving the output voltage and making a comparison between the output voltage and an overvoltage level which is higher than a set value of the output voltage by a given level to output an overvoltage detect signal from its output end when the output voltage rises to the overvoltage level, and a negative feedback control circuit comprising a first input end connected to the output end of the main circuit and a second input end connected to the output end of the overvoltage detecting circuit, controlling a duty factor of the control voltage to the switching element on the basis of negative feedback of the output voltage when the overvoltage detect signal is not provided as its input, and controlling the duty factor of the control voltage to 0% to force the switching element into the OFF state when the overvoltage detect signal is provided as its input.

The first aspect provides the following noticeable function and effect; the new overvoltage detecting circuit and the new negative feedback control circuit eliminate the need to receive an external activation stop command particularly when the load changes from the rated condition to a light load or no-load condition, and the switching element can be automatically turned off to stop only the active filter operation.

That is to say, in this case, the output voltage rises toward an overvoltage level at which the performance of the load capacitor may be deteriorated. At this time, the overvoltage detecting circuit monitors the rise of the output voltage by comparing the received signal corresponding to the output voltage with a reference voltage corresponding to a predetermined overvoltage level, and when the output voltage reaches the overvoltage level, it detects the state and outputs an overvoltage detect signal to the negative feedback control circuit. The negative feedback control circuit is in the ON operation state and responsive to the input of the overvoltage detect signal to control the duty factor of the waveform of the control signal to 0% and applies the control signal with 0% duty factor to the control electrode of the switching element. This causes the switching element to turn off and the main circuit stops the active filter operation, and the output voltage falls as the load capacitor is discharged. The negative feedback control circuit is always in the ON operation state throughout the process.

A second aspect of the invention is an improvement of the first aspect, which is characterized in that the overvoltage detecting circuit further makes a comparison between a reset level lower than the overvoltage level and the output voltage, and it maintains output of the overvoltage detect signal until the output voltage which has risen to the overvoltage level falls to the reset level and stops the output of the overvoltage detect signal when the output voltage reaches the reset level, and the negative feedback control circuit keeps controlling the duty factor of the control voltage at 0% while the overvoltage detect signal is being provided as its input.

The second aspect provides the effect that the active filter operation of the main circuit can be automatically restarted within the system by automatically controlling the switching element into the ON operation in response to a fall of the output voltage to the set value, without requiring generation/input of an external reactivation command. When the output voltage reaches the overvoltage level again after the restart, only the active filter operation of the main circuit can be automatically stopped again within the system. Particularly, since the negative feedback control circuit always stays in the ON operation state during the period in which the active filter operation of the main circuit is stopped and then restarted, the active filter operation can be restarted without suffering from the generation of excessive inrush current from which the conventional technique has suffered, whereby this aspect provides the noticeable effect of preventing the reactor from generating abnormal current due to the inrush current.

That is to say, the overvoltage detecting circuit keeps outputting the overvoltage detect signal while the output voltage is lower than the overvoltage level and higher than the reset level, so as to continuously cause the negative feedback control circuit to output the control signal having the duty factor of 0%. Accordingly the active filter operation of the main circuit is kept off. The overvoltage detecting circuit does not stop the output of the overvoltage detect signal until it detects that the output voltage has reached the reset level later. In response, the negative feedback control circuit is freed from the control by the overvoltage detecting circuit and returns to the original negative feedback operation. Then, when the output voltage reaches the set value, the negative feedback control circuit controls the duty factor of the control voltage within an appropriate range to maintain the output voltage at the set value, but the output voltage gradually rises toward the overvoltage as the load capacitor is charged by the extra current exceeding the value required to drive the load in the light load or no-load condition, and thus the series of operations is repeated.

A third aspect of the invention belongs to improvement of the second aspect, which is characterized in that the negative feedback control circuit comprises: a first signal line transferring the output voltage; a voltage setting circuit outputting an output voltage set value signal which gives the set value of the output voltage as a given value; a first differential amplifier circuit having its negative input end connected to an output end of the first signal line and its positive input end connected to an output end of the voltage setting circuit; a second signal line having its one end connected to the first output end of the full-wave rectifying circuit, and transferring a full-wave rectified current signal which gives a full-wave rectified current; a multiplier circuit having its input ends connected to an output end of the first differential amplifier circuit and an other end of the second signal line, and multiplying an output signal of the first differential amplifier circuit and the full-wave rectified current signal together; a third signal line having its one end connected to the second end of the current detecting resistor; a second differential amplifier circuit having its negative input end connected to an other end of the third signal line and its positive input end connected to an output end of the multiplier circuit; a fourth signal line having its one end connected to an output end of the second differential amplifier circuit; an oscillator generating a signal which is at a given frequency and has a given waveform having its valley voltage at a first level and its peak voltage at a second level; a comparator having its first input end connected to an other end of the fourth signal line and its second input end connected to an output end of the oscillator, outputting the control voltage having the duty factor equal to 0% when a signal at the other end of the fourth signal line is equal to the first level, outputting the control voltage having the duty factor equal to 100% when the signal at the other end of the fourth signal line is equal to the second level, and varying the duty factor in proportion to the signal at the other end of the fourth signal line when the signal at the other end of the fourth signal line is larger than the first level and smaller than the second level; a fifth signal line having its one end connected to an output end of the comparator and its other end connected to the control electrode of the switching element, and a sixth signal line having its one end connected to the output end of the overvoltage detecting circuit and its other end connected to the output end of the second differential amplifier circuit, and wherein the overvoltage detecting circuit outputs the overvoltage detect signal at such a given level as to bring the signal at the other end of the fourth signal line to or below the first level.

According to the third aspect of the invention, the overvoltage detect signal outputted from the overvoltage detecting circuit is directly applied to the output end of the second differential amplifier circuit, so that a voltage not exceeding the first level is kept applied to the first input end of the comparator while the output voltage is at or below the overvoltage level and larger than the reset level (in the period in which the output voltage is falling). Accordingly the comparator keeps generating and outputting the control signal with 0% duty factor and the switching element in the main circuit is maintained in the OFF state. When the output voltage falls to reach the reset level and the overvoltage detecting circuit stops the output of the overvoltage detect signal, the potential at the output end of the second differential amplifier circuit is freed from the voltage not higher than the first level and slowly rises to or above the first level, and the negative feedback control circuit starts the original negative feedback operation. As a result, the signal applied to the first input end of the comparator circuit becomes a signal having its valley voltage at the first level and the comparator circuit outputs the control signal having its duty factor in the vicinity of 0%.

In this way, according to this aspect, when restarting the active filter operation of the main circuit, the potential at the output end of the second differential amplifier circuit can be raised slowly toward the first level from the given voltage equal to or below the first level, which perfectly prevents generation of the excessive inrush current when reactivating or restarting the active filter operation. Thus the output voltage can be stably controlled within the given range over the entire load condition while maintaining the original advantages of the main circuit, i.e. the power-factor improvement and harmonic component reduction.

A fourth aspect of the invention belongs to the improvement of the second aspect. That is to say, the negative feedback control circuit comprises: a first resistor having its one end connected to the output end of the main circuit; a second resistor having its one end connected to an other end of the first resistor; a control power supply connected to an other end of the second resistor and having a DC power-supply value capable of being variably set; a first differential amplifier circuit having its negative input end connected to the other end of the first resistor, receiving a constant reference voltage at its positive input end, and comparing a level at the other end of the first resistor and the reference voltage to output a differential signal; a multiplier circuit having a first input end connected to an output end of the first differential amplifier circuit and a second input end connected to the first output end of the full-wave rectifying circuit through a third resistor, and multiplying an output signal of the first differential amplifier circuit and a full-wave rectified current signal together; a second differential amplifier circuit having its negative input end connected to the second end of the current detecting resistor and its positive input end connected to an output end of the multiplier circuit; a second differential amplifier circuit output signal line having its one end connected to an output end of the second differential amplifier circuit; an oscillator generating a clock which is at a given frequency and has a given waveform having its valley voltage at a first level and its peak voltage at a second level; a comparator having its first input end connected to an other end of the second differential amplifier circuit output signal line and its second input end connected to an output end of the oscillator, outputting the control voltage having the duty factor equal to 0% when a signal at the other end of the second differential amplifier circuit output signal line is equal to the first level, outputting the control voltage having the duty factor equal to 100% when the signal at the other end of the second differential amplifier circuit output signal line is equal to the second level, and varying the duty factor in proportion to the signal at the other end of the second differential amplifier circuit output signal line when the signal at the other end of the second differential amplifier circuit output signal line is larger than the first level and smaller than the second level; a control signal output line having its one end connected to an output end of the comparator and its other end connected to the control electrode of the switching element, and an overvoltage detect signal line having its one end connected to the output end of the overvoltage detecting circuit and its other end connected to the output end of the second differential amplifier circuit, and wherein the overvoltage detecting circuit has its input end connected to the other end of the first resistor, and the overvoltage detecting circuit outputs the overvoltage detect signal at such a given level as to bring the signal at the other end of the second differential amplifier circuit output signal line to or below the first level.

According to the fourth aspect, the overvoltage detecting circuit makes (1) a first comparison between the voltage at the connection point between the first resistor and the second resistor and a reference voltage corresponding to the overvoltage level, and (2) a second comparison between the voltage at the connection point and a reference voltage corresponding to the reset level. Since the output voltage is controlled to be equal to the set value by the negative feedback operation of the negative feedback circuit, the voltage at the connection point is equal to the reference voltage applied to the first differential amplifier circuit. Therefore the voltage variation at the connection point is equal to the variation of the output voltage. This means that the first comparison made by the overvoltage detecting circuit corresponds to the comparison between the output voltage and the overvoltage level and the second comparison corresponds to the comparison between the output voltage and the reset level. Accordingly, even when the overvoltage level reference voltage and the reset level reference voltage for the overvoltage detecting circuit are set at fixed values, the overvoltage detecting circuit can surely detect the output voltage coming into the overvoltage state and the output voltage falling to the reset level for the currently provided output voltage set value even when the output voltage set value is changed.

Thus, according to the fourth aspect, the set value of the output voltage can be varied freely and the variation of the output voltage can always be suppressed within a given range despite the variation of the output voltage, and only the switching element can be automatically turned on/off within the system in this operation so that abnormal sound due to excessive inrush current is not caused. That is to say, in a control scheme in which the output voltage of the active filter can be freely set, the system of this aspect provides a control method in which the overvoltage level and the reset level can be varied following the set value of the output voltage over the entire range of the set output voltage. This provides an active filter system which is applicable to the PAM control.

A fifth aspect of the invention belongs to improvement of the fourth aspect. That is to say, the output end of the first differential amplifier circuit is also connected to the other end of the overvoltage detect signal line through a seventh signal line, and the given level of the overvoltage detect signal corresponds to the ground potential.

According to the fifth aspect, the potential at the output end of the first differential amplifier circuit is also controlled by the overvoltage detecting circuit, and when the overvoltage detecting circuit is outputting the overvoltage detect signal, the output voltage of the first differential amplifier circuit is also forced to the ground potential, so that the negative feedback control circuit cannot perform the negative feedback operation. This allows the reset level to be set to a value lower than the set value of the output voltage. In other words, the effects of the fourth aspect of the invention can be obtained even when the voltage obtained by dividing the set value of the output voltage at the first and second resistors is between the overvoltage level operation point and the reset level operation point; since the difference between the set value of the output voltage and the overvoltage level can be set smaller, it is possible to generate more stable output voltage varying in a smaller range.

A sixth aspect of the invention is characterized in that the power supply of the second aspect is a single-phase AC power supply.

This aspect provides an AC-DC converter circuit which can stably control the output voltage within a constant range over the entire load condition without causing overshoot voltage of the output voltage and without causing abnormal sound due to inrush current.

A seventh aspect is an improvement of the sixth aspect, which is characterized in that the power supply is defined as a first AC power supply and the main circuit is defined as a first main circuit, and the boosting active filter system further comprises: a second AC power supply whose phase is shifted by 120 degrees with respect to the first AC power supply; a third AC power supply whose phase is shifted by 240 degrees with respect to the first AC power supply; a second input signal line for inputting a second AC power-supply voltage of the second AC power supply; a third input signal line inputting a third AC power-supply voltage of the third AC power supply; a second main circuit having its input end connected to the second input signal line and its output end connected to the load, converting the second AC power-supply voltage to a second DC voltage and outputting the second DC voltage as the output voltage, and a third main circuit having its input end connected to the third input signal line and its output end connected to the load, and converting the third AC power-supply voltage to a third DC voltage and outputting the third DC voltage as the output voltage, and wherein the second main circuit comprises: a second full-wave rectifying circuit connected to the second input signal line and having its second output end connected to the second end of the load capacitor; a second reactor having its first end connected to a first output end of the second full-wave rectifying circuit; a second rectifier diode having its anode electrode connected to a second end of the second reactor and its cathode electrode connected to the output end of the second main circuit, and a second switching element having its first main electrode connected to the second end of the second reactor and its second main electrode connected to the second end of the load capacitor, the second switching element performing ON operation when a second control voltage applied to its control electrode is at an ON level and performing OFF operation when the second control voltage is at an OFF level, and the third main circuit comprises: a third full-wave rectifying circuit connected to the third input signal line and having its second output end connected to the second end of the load capacitor; a third reactor having its first end connected to a first output end of the third full-wave rectifying circuit; a third rectifier diode having its anode electrode connected to a second end of the third reactor and its cathode electrode connected to the output end of the third main circuit, and a third switching element having its first main electrode connected to the second end of the third reactor and its second main electrode connected to the second end of the load capacitor, the switching element performing ON operation when a third control voltage applied to its control electrode is at an ON level and performing OFF operation when the third control voltage is at an OFF level, and wherein the negative feedback control circuit further comprises: an eighth signal line having its one end connected to the one end of the fifth signal line and its other end connected to the control electrode of the second switching element, shifting phase of the control voltage outputted from the comparator by 120 degrees and transferring the control voltage which has been shifted as the second control voltage, and a ninth signal line having its one end connected to the one end of the fifth signal line and its other end connected to the control electrode of the third switching element, shifting phase of the control voltage outputted from the comparator by 240 degrees and transferring the control voltage which has been shifted as the third control voltage.

This aspect utilizes the active filter configuration for use with a single-phase AC power supply which can stably control the output voltage within a constant range over the entire load condition without causing overshoot voltage of the output voltage and without causing abnormal sound due to inrush current, so that it can realize an active filter system for use with a three-phase AC power supply which provides the same effects.

An eighth aspect of the invention is characterized in that the load of the sixth aspect is an inverter circuit.

This aspect provides an inverter circuit having the active filter which can stably control the output voltage within a constant range over the entire load condition without causing overshoot voltage of the output voltage and without causing abnormal sound due to inrush current.

A ninth aspect of the invention is characterized in that the load of the sixth aspect is an AC servomotor.

This aspect provides an AC servomotor having the active filter which can stably control the output voltage within a constant range over the entire load condition without causing overshoot voltage of the output voltage and without causing abnormal sound due to inrush current.

A tenth aspect of the invention is characterized in that the power supply of the second aspect is a given DC power supply.

This provides a DC-DC converter circuit which can stably control the output voltage within a constant range over the entire load condition without causing overshoot voltage of the output voltage and without causing abnormal sound due to inrush current.

An eleventh aspect of the invention is directed to a device for controlling a boosting active filter, wherein the boosting active filter receives a power-supply signal outputted from an external power supply and full-wave rectifies the power-supply signal in a full-wave rectifying circuit, and when a switching element is in an ON operation state, the boosting active filter passes the full-wave rectified current to a loop including a reactor, the switching element, a current detecting resistor, and the full-wave rectifying circuit, and when the switching element is in an OFF operation state, the boosting active filter passes the full-wave rectified current to a load capacitor connected to a load in parallel through the reactor and a rectifier diode, the control device comprising: overvoltage detecting means for receiving a signal giving an output voltage supplied to the load, and making a first comparison between the output voltage and an overvoltage level which is higher than a set value of the output voltage by a given level to output an overvoltage detect signal from its output end when the output voltage rises to the overvoltage level, and negative feedback control means for receiving the output voltage, the overvoltage detect signal, and an activation command signal generated outside, wherein the negative feedback control means starts its operation in response to input of the activation command signal and maintains its ON operation state while the activation command signal is being inputted, the negative feedback control means controlling a duty factor of a control voltage to the switching element on the basis of negative feedback of the output voltage when the overvoltage detect signal is not provided as its input in the ON operation state, and controlling the duty factor of the control voltage to 0% to force the switching element to stay in the OFF state when the overvoltage detect signal is provided as its input in the ON operation state.

This aspect provides an active filter having the same functions and effects as the first aspect above.

A twelfth aspect of the invention is an improvement of the boosting active filter control device of the eleventh aspect, which is characterized in that the overvoltage detecting means further makes a second comparison between a reset level lower than the overvoltage level and the output voltage subsequently to the first comparison, and maintains output of the overvoltage detect signal until the output voltage which has risen to the overvoltage level falls to the reset level and stops the output of the overvoltage detect signal when the output voltage reaches the reset level, and while the overvoltage detect signal is being provided as input, the negative feedback control means keeps controlling the duty factor of the control voltage at 0% while staying in the ON operation state.

This aspect provides an active filter having the same functions and effects as the second aspect above.

A thirteenth aspect of the invention is an improvement of the boosting active filter control device of the twelfth aspect, which is characterized in that the negative feedback control means comprises: first resistor means having its one end connected to one end of the load; second resistor means having its one end connected to an other end of the first resistor means; and variable DC power-supply means having its one end connected to an other end of the second resistor means and its other end grounded, and the negative feedback control means sets a voltage at the other end of the first resistor means to a negative feedback signal giving the output voltage to perform the negative feedback, controls the duty factor of the control voltage by the negative feedback, and can freely vary the set value of the output voltage by varying a voltage of the variable DC power-supply means, and wherein the overvoltage detecting means makes the first comparison by using the voltage at the other end of the first resistor means as the signal giving the output voltage, the given level in the first comparison being always set at a constant value.

This aspect provides an active filter having the same functions and effects as the fourth aspect above.

A fourteenth aspect of the invention is an improvement of the boosting active filter control device of the thirteenth aspect, which is characterized in that the reset level is set on the basis of a value lower than the voltage at the other end of the first resistor means obtained when the output voltage supplied to the load has a value equal to the set value.

This aspect provides an active filter having the same functions and effects as the fifth aspect above.

A fifteenth aspect of the invention is directed to a device controlling a boosting active filter, wherein the boosting active filter receives a power-supply signal outputted from an external power supply and full-wave rectifies the power-supply signal in a full-wave rectifying circuit, and when a switching element is in an ON operation state, the boosting active filter passes the full-wave rectified current to a loop including a reactor, the switching element, a current detecting resistor, and the full-wave rectifying circuit, and when the switching element 7 is in an OFF operation state, the boosting active filter passes the full-wave rectified current to a load capacitor connected to a load in parallel through the reactor and a rectifier diode, the control device comprising: an overvoltage detecting circuit receiving a signal giving mn output voltage of the boosting active filter supplied to the load, making a first comparison between the output voltage and an overvoltage level which is higher than a set value of the output voltage by a given level and outputting an overvoltage detect signal from its output end when the output voltage rises to the overvoltage level, and further making a second comparison between a reset level lower than the overvoltage level and the output voltage subsequently to the first comparison and maintaining output of the overvoltage detect signal until the output voltage which has risen to the overvoltage level falls to the reset level and stopping the output of the overvoltage detect signal when the output voltage reaches the reset level, and a negative feedback control circuit controlling a duty factor of a control voltage to the switching element on the basis of negative feedback of the output voltage when the overvoltage detect signal is not provided as its input, controlling the duty factor of the control voltage to 0% to force the switching element into the OFF state when the overvoltage detect signal is provided as its input, and keeping the duty factor of the control voltage at 0% while the overvoltage detect signal is being provided as its input.

This aspect provides an active filter having the same functions and effects as the second aspect above.

A sixteenth aspect of the invention is an improvement of the boosting active filter control device of the fifteenth aspect, which is characterized in that the negative feedback control circuit comprises: a first signal line transferring the output voltage; a voltage setting circuit outputting an output voltage set value signal which gives the set value of the output voltage of the boosting active filter as a given value; a first differential amplifier circuit having its negative input end connected to an output end of the first signal line and its positive input end connected to an output end of the voltage setting circuit; a second signal line having its one end connected to a first output end of the full-wave rectifying circuit located on the side of the reactor, and transferring a full-wave rectified current signal which gives the full-wave rectified current; a multiplier circuit having its input ends connected to an output end of the first differential amplifier circuit and an other end of the second signal line, and multiplying an output signal of the first differential amplifier circuit and the full-wave rectified current signal together, a third signal line having its one end connected to one end of the current detecting resistor located on the side of the full-wave rectifying circuit; a second differential amplifier circuit having its negative input end connected to an other end of the third signal line and its positive input end connected to an output end of the multiplier circuit; a fourth signal line having its one end connected to an output end of the second differential amplifier circuit; an oscillator generating a clock which is at a given frequency and has a given waveform having its valley voltage at a first level and its peak voltage at a second level; a comparator having its first input end connected to an other end of the fourth signal line and its second input end connected to an output end of the oscillator, outputting the control voltage having the duty factor equal to 0% when a signal at the other end of the fourth signal line is equal to the first level, outputting the control voltage having the duty factor equal to 100% when the signal at the other end of the fourth signal line is equal to the second level, and varying the duty factor in proportion to the signal at the other end of the fourth signal line when the signal at the other end of the fourth signal line is larger than the first level and smaller than the second level; a fifth signal line having its one end connected to an output end of the comparator and its other end connected to a control electrode of the switching element, and a sixth signal line having its one end connected to the output end of the overvoltage detecting circuit and its other end connected to the output end of the second differential amplifier circuit, and wherein the overvoltage detecting circuit outputs the overvoltage detect signal at such a given level as to bring the signal at the other end of the fourth signal line to or below the first level.

This aspect provides an active filter having the same functions and effects as the third aspect above.

A seventeenth aspect of the invention is an improvement of the boosting active filter control device of the fifteenth aspect, which is characterized in that the negative feedback control circuit comprises: a first resistor having its one end connected to one end of the load which corresponds to an output end of the boosting active filter; a second resistor having its one end connected to an other end of the first resistor; a control power supply connected to an other end of the second resistor and having a DC power-supply value capable of being variably set; a first differential amplifier circuit having its negative input end connected to the other end of the first resistor, receiving a constant reference voltage at its positive input end, and comparing a level at the other end of the first resistor and the reference voltage to output a differential signal; a multiplier circuit having a first input end connected to an output end of the first differential amplifier circuit and a second input end connected to a first output end of the full-wave rectifying circuit located on the side of the reactor through a third resistor, and multiplying an output signal of the first differential amplifier circuit and a full-wave rectified current signal giving the full-wave rectified current together; a second differential amplifier circuit having its negative input end connected to a second output end of the full-wave rectifying circuit located on the side of the current detecting resistor and its positive input end connected to an output end of the multiplier circuit; a second differential amplifier circuit output signal line having its one end connected to an output end of the second differential amplifier circuit; an oscillator generating a clock which is at a given frequency and has a given waveform having its valley voltage at a first level and its peak voltage at a second level; a comparator having its first input end connected to an other end of the second differential amplifier circuit output signal line and its second input end connected to an output end of the oscillator, outputting the control voltage having the duty factor equal to 0% when a signal at the other end of the second differential amplifier circuit output signal line is equal to the first level, outputting the control voltage having the duty factor equal to 100% when the signal at the other end of the second differential amplifier circuit output signal line is equal to the second level, and varying the duty factor in proportion to the signal at the other end of the second differential amplifier circuit output signal line when the signal at the other end of the second differential amplifier circuit output signal line is larger than the first level and smaller than the second level; a control signal output line having its one end connected to an output end of the comparator and its other end connected to a control electrode of the switching element, and an overvoltage detect signal line having its one end connected to the output end of the overvoltage detecting circuit and its other end connected to the output end of the second differential amplifier circuit, and wherein the overvoltage detecting circuit has its input end connected to the other end of the first resistor, and the overvoltage detecting circuit outputs the overvoltage detect signal at such a given level as to bring the signal at the other end of the second differential amplifier circuit output signal line to or below the first level.

This aspect provides an active filter having the same functions and effects as the fourth aspect above.

An eighteenth aspect of the present invention is an improvement of the boosting active filter control device of the seventeenth aspect, which is characterized in that the output end of the first differential amplifier circuit is also connected to the other end of the overvoltage detect signal line.

This aspect provides an active filter having the same functions and effects as the fifth aspect above.

The above-mentioned and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the entire structure of an active filter system according to a first preferred embodiment.

FIG. 6 is a block diagram showing the entire structure of an active filter system according to a second preferred embodiment.

FIGS. 13 and 14 are diagrams showing a conventional technique.

FIG. 15 is a timing chart pointing out problems of the conventional technique of FIG. 14.

Figure 2:
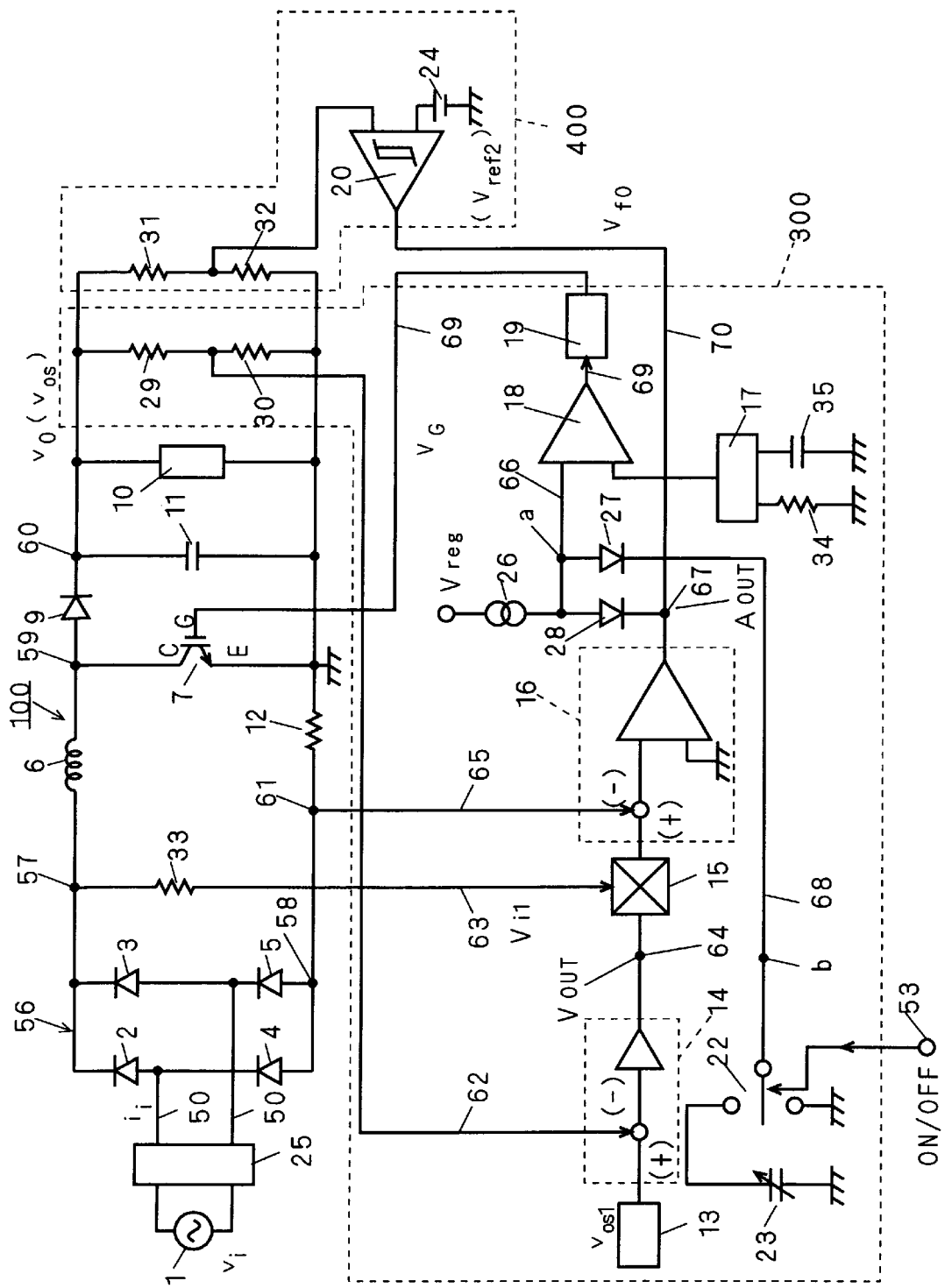
FIG. 2 is a circuit diagram showing a specific structure of the active filter system of the first preferred embodiment.

DESCRIPTION OF THE PREFERRED EMBODIMENTS (First Preferred Embodiment)

FIG. 1 is a block diagram showing the entire structure of an active filter system according to this invention. As shown in FIG. 1, this system generally includes a single-phase AC power supply 1, a noise filter 25, an input signal line 50 for input of an AC power-supply voltage $v_i$, a main circuit 100 as an active filter, a load 10, and a control circuit 200 for controlling the active filter. FIG. 1 also shows a microcomputer 500 as an external system attached to this system. The microcomputer 500 generates a control signal ON/OFF for starting/stopping the control circuit 200 and outputs the signal ON/OFF to the third input end 53 of the control circuit 200. As shown in FIG. 1, the control circuit 200 can be roughly divided into a negative feedback control circuit 300 and an overvoltage detecting circuit 400.

In this system, as will be described later, the main circuit 100 has the same structure as the basic circuit of the conventional active filter shown in FIG. 13, which has input ends connected to the input signal line 50 and an output end 51 connected to the load 10, and which converts the AC power-supply voltage $v_i$ to a DC voltage and outputs the DC voltage $v_o$ as the output voltage. More specifically, the circuit 100 functions as an active filter or an AC-DC converting circuit, which receives a power-supply signal outputted from the external AC power supply 1 and full-wave rectifies the power-supply signal in a full-wave rectifying circuit; when the switching element is in the ON operation state, it passes the full-wave rectified current to a closed loop including a reactor, the switching element, a current detecting resistor, and the full-wave rectifying circuit, and when the switching element is in the OFF operation state, it passes the full-wave rectified current to a load capacitor connected to the load 10 in parallel through the reactor and a rectifier diode. Hence this main circuit 100 maintains the excellent effects of the conventional technique: (1) increasing the power-factor of the power supply (the power factor=1) and (2) reducing the percentage content of harmonic component (attenuating the third or higher wave).

The overvoltage detecting circuit 400 receives a signal which gives the DC output voltage (hereinafter referred to simply as an output voltage), and makes a first comparison which corresponds to a comparison between the output voltage and an overvoltage level higher than a set value of the output voltage by a given level (a constant value) and outputs an overvoltage detect signal $V_{fo}$ from its output end when the output voltage rises to the overvoltage level. In addition, the circuit 400 further has a reference voltage value corresponding to a reset level lower than the overvoltage level, and it also makes a second comparison corresponding to a comparison between the output voltage and the reset level, and it maintains the output of the overvoltage detect signal $V_{fo}$ until the output voltage at the overvoltage level falls to the reset level and stops the output of the overvoltage detect signal $V_{fo}$ when the output voltage reaches the reset level.

The overvoltage detect signal $V_{fo}$ is a signal having such a given level as to bring a signal at an end of a fourth signal line 66 described later to or below a first level corresponding to the valley voltage of an oscillation waveform described later.

The negative feedback control circuit 300 has a first input end 51 connected to the output end of the main circuit 100, a second input end 52 connected to the output end of the overvoltage detecting circuit 400, and a third input end 53 receiving the external activation command signal, and it starts its operation in response to the input of the activation command signal ON and maintains the ON operation state while the activation command signal ON is being inputted. When the overvoltage detect signal $V_{fo}$ is not inputted in the ON operation state, the circuit 300 controls the duty factor of the waveform of the control voltage $V_G$ to the switching element in the main circuit on the basis of the negative feedback of the output voltage. When the overvoltage detect signal $V_{fo}$ is inputted in the ON operation state, it controls the duty factor of the waveform of the control voltage $V_G$ to 0% to force the switching element into OFF state, and keeps the duty factor of the waveform of the control voltage $V_G$ at 0% while the overvoltage detect signal $V_{fo}$ is being inputted.

The functions of the both circuits 300 and 400 will become clearer by the description based on FIGS. 2 to 5 given later.

Next, FIG. 2 shows an example of a specific structure of the system shown in FIG. 1.

The main circuit 100 includes the components described below. First, the input signal line 50 transfers the power-supply signal of the AC power supply 1 (voltage $V_i$, current $i_i$) to the input ends 54 and 55 of the main circuit 100 through the noise filter 25. The full-wave rectifying circuit 56 connected to the input signal line 50 includes diodes 2 to 5, and the first end of the reactor 6 is connected to the first output end 57 of the full-wave rectifying circuit 56. The rectifier diode 9 has its anode electrode connected to the second end 59 of the reactor 6 and its cathode electrode connected to the output end 60 of the main circuit 100, and the load capacitor 11 has its first end connected to the output end 60 of the main circuit 100 and its second end grounded. The switching element 7 composed of an IGBT herein has its first main electrode (collector) C connected to the second end 59 of the reactor 6 and its second main electrode (emitter) E connected to the grounded second end of the load capacitor 11, and its control electrode (gate) G receives the control voltage $V_G$. This element 7 performs ON operation when the control voltage $V_G$ is at an ON level and performs OFF operation when the control voltage $V_G$ is at an OFF level. The second main electrode E of the switching element 7 is connected to the first end of the current detecting resistor 12 whose second end 61 is connected to the second output end 58 of the full-wave rectifying circuit 56.

The overvoltage detecting circuit 400 includes a hysteresis comparator 20 having hysteresis characteristic as the main component, and it also includes two resistors 31 and 32 for dividing the output voltage $v_o$. The hysteresis comparator 20 has an overvoltage reference level $V_{ref1}$ (trip level) corresponding to an overvoltage higher than the set value $v_{os}$ of the output voltage $v_o$ by a given level (herein it is about 10 V to 20 V including variations in design) and a reset level ($V_{ref2}$) lower than it ($V_{ref1}$) and higher than the set value $v_{os}$ of the output voltage $v_o$ by a given level (about 5V herein) ($v_{os}<V_{ref2}<V_{ref1}$). Particularly, the power supply 24 shown in FIG. 2 sets the overvoltage reference level $V_{ref1}$. The reset level ($V_{ref2}$) is a level which is set inside the comparator 20. When the values of the resistors 31 and 32 are shown by characters R31 and R32, the comparator 20 outputs the overvoltage detect signal $V_{fo}$ when the relation $v_0 \geq (R31+R32)/R32 \times V_{ref1}$, and the comparator 20 stops the output of the signal $V_{fo}$ when the output voltage $v_o$ satisfies the condition $v_o \leq (R31+R32)/R32 \times V_{ref2}$.

The negative feedback control circuit 300 includes a first signal line 62 for transferring the output voltage $v_o$ through the voltage-dividing resistors 29 and 30, a voltage setting circuit 13 for outputting an output voltage set value signal $v_{os1}$ which gives the set value $v_{os}$ of the output voltage $v_o$ as a given value, a first differential amplifier circuit 14 having its negative input end (−) connected to the output end of the first signal line 62 and its positive input end (+) connected to the output end of the voltage setting circuit 13, a second signal line 63 having its one end connected to the first output end 57 of the full-wave rectifying circuit 56 and transferring a full-wave rectified current signal $V_{i1}$ which gives the full-wave rectified current through the resistor 33, and a multiplier circuit 15 having its input ends connected to the output end 64 of the first differential amplifier circuit 14 and to the other end of the second signal line 63, for multiplying together the output signal $V_{OUT}$ of the first differential amplifier circuit 14 and the full-wave rectified current signal $V_{i1}$. The first signal line 62 is defined as including the voltage-dividing resistors 29 and 30. When the values of the voltage-dividing resistors 29 and 30 are represented as characters R29 and R30, the output voltage set value signal $v_{os1}$ is given by $v_{os}/(R29+R30) \times R30$. In other words, the set value $v_{os}$ is set by the circuit 13 as $vo_{os1} \times (R29+R30)/R30$.

The negative feedback control circuit 300 also includes a third signal line 65 having its one end connected to the second end 61 of the current detecting resistor 12, a second differential amplifier circuit or current amplifier 16 having its negative input end (−) connected to the other end of the third signal line 65 and its positive input end (+) connected to the output end of the multiplier circuit 15, and a fourth signal line 66 including a diode 28 and having its one end connected to the output end 67 of the second differential amplifier circuit 16.

The negative feedback control circuit 300 further includes an oscillator 17 for generating a signal at a given frequency (10 kHz to 50 kHz herein) and having a given waveform with a valley voltage at a first level and a top voltage at a second level (it is a triangular wave herein but it can be a sawtooth wave), a comparator 18 having its first input end connected to the other end "a" of the fourth signal line 66 and its second input end connected to the output end of the oscillator 17, a constant-current source 26 connected to the first input end of the comparator 18, a tenth signal line 68 having its one end connected to the first input end of the comparator 18 and including a diode 27, a soft start DC power supply 23 for activation, a start switch circuit 22 connected to the third terminal 53 and the other end of the tenth signal line 68, which connects the soft start DC power supply 23 to the other end of the tenth signal line 68 only when the activation command signal ON is being inputted and continuously grounds the other end of the tenth signal line 68 when the activation command signal ON is not inputted or when the signal OFF is being inputted, a fifth signal line 69 having its one end connected to the output end of the comparator 18 and its other end connected to the control electrode G of the switching element 7 and including a gate driver 19, and a sixth signal line 70 having its one end connected to the output end of the hysteresis comparator 20 and the other end connected to the output end 67 of the second differential amplifier circuit 16.

Figure 3A:
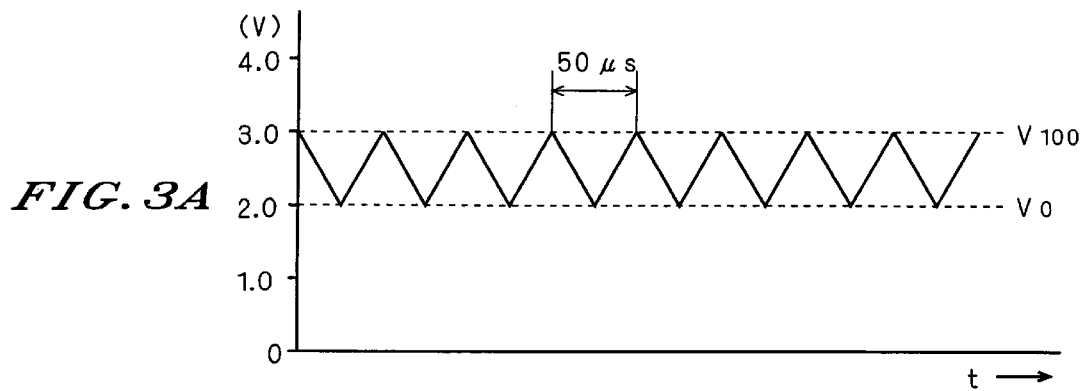
FIG. 3(A–C) are diagram showing the output waveform of the oscillator and the voltage waveform at one input of the comparator.
Figure 3B:
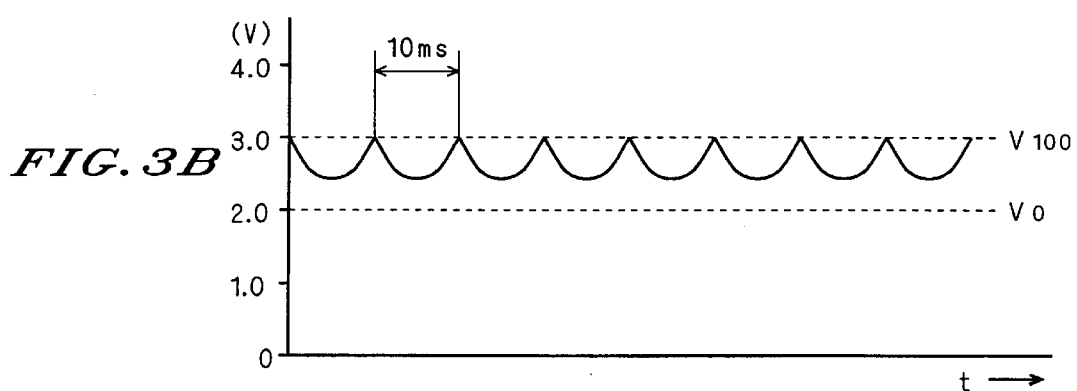
Figure 3C:
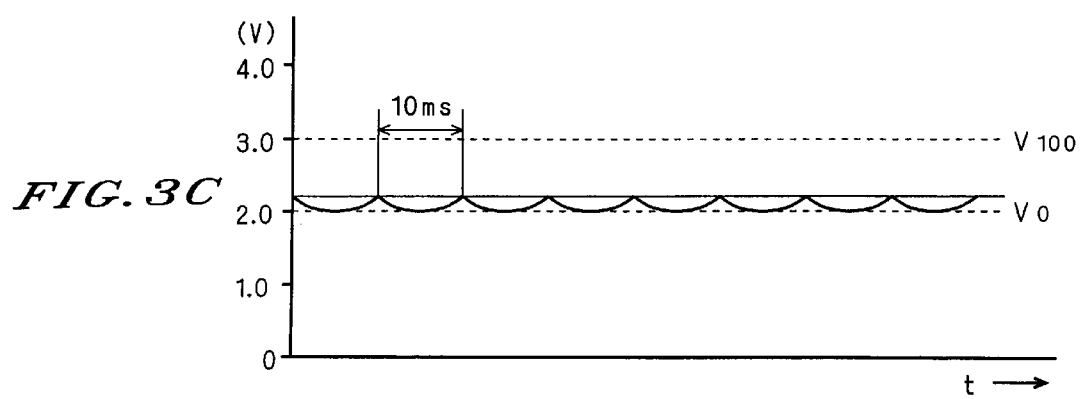

In FIG. 3, (A) shows an example of the output waveform of the oscillator 17 (frequency 20 kHz) is shown.

Figure 4:
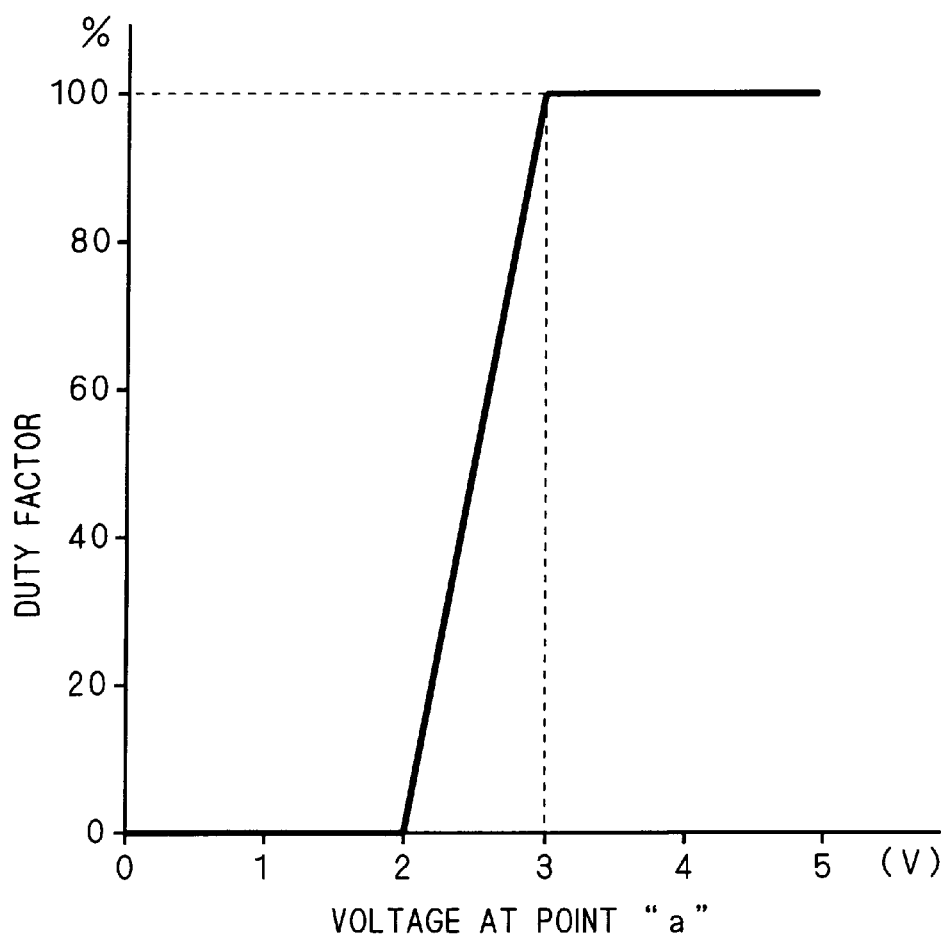
FIG. 4 is a diagram showing the relation between the duty factor of the output waveform of the comparator and the input voltage.

When the signal at the other end "a" of the fourth signal line 66 is equal to or below the first level, the comparator 18 outputs the control voltage $V_G$ having a duty factor of 0%, and when the signal at the other end a of the fourth signal line 66 is equal to or above the second level, it outputs the control voltage $V_G$ having a duty factor of 100%; when the signal at the other end a of the fourth signal line 66 is larger than the first level and smaller than the second level, it linearly varies the duty factor in proportion to the signal at the other end a of the fourth signal line 66. FIG. 4 shows this variation.

Figure 14:
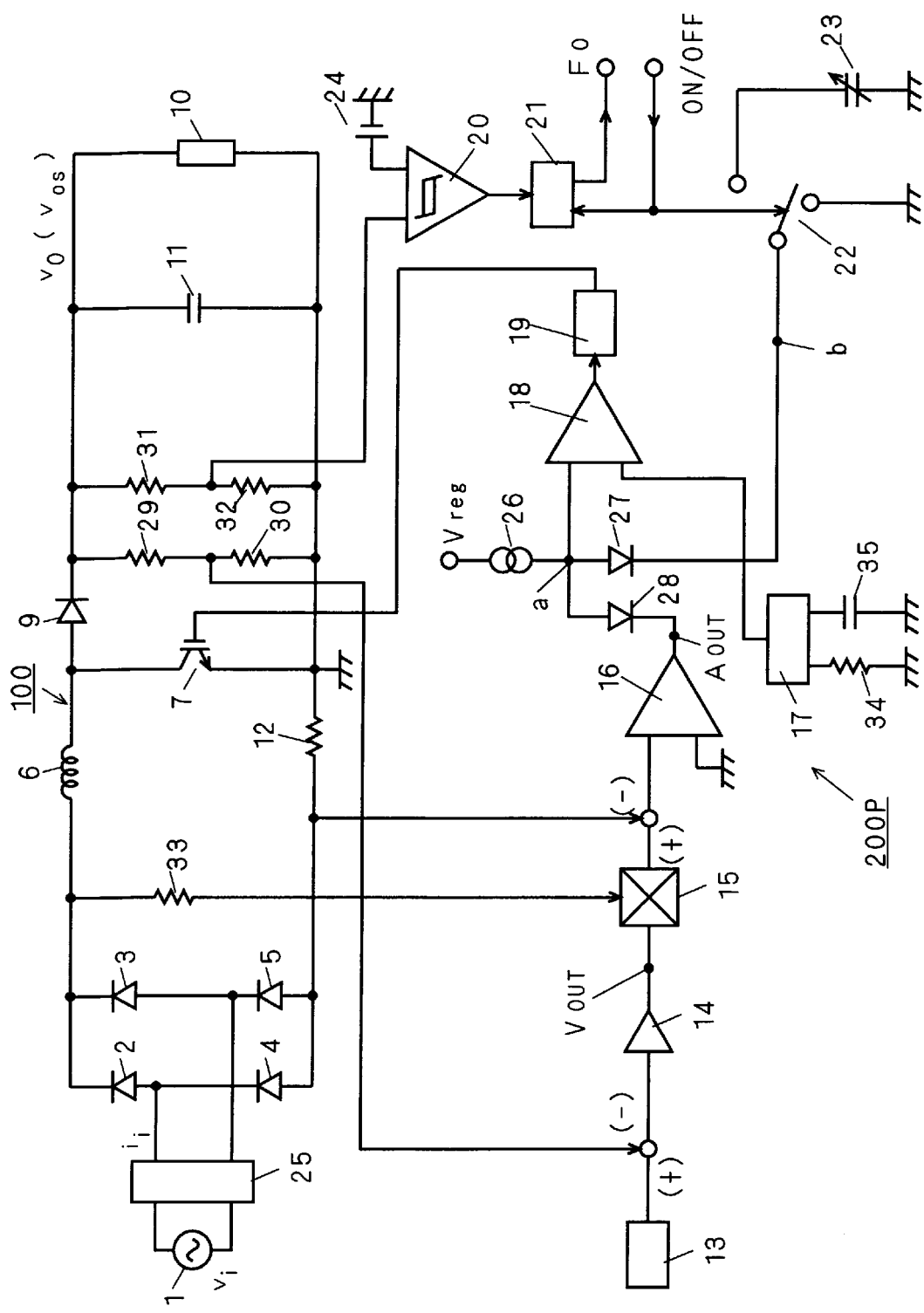

In FIG. 2 described above, the same reference characters as those in FIG. 14 show the same components as those in FIG. 14. Accordingly, the structure of the system shown in FIG. 2 is the same as the conventional circuit shown in FIG. 14 except in the following respects:(1) only the hysteresis comparator 20 is used in place of the combination of the hysteresis comparator 20 and the flip-flop 21 shown in FIG. 14, (2) the output signal $V_{fo}$ of the hysteresis comparator 20 is directly applied to the output end 67 of the second differential amplifier circuit 16 and the operation of the circuit 16 is directly controlled by the hysteresis comparator 20, and (3) input/output of the activation command signal ON and the activation stop signal OFF are set completely independently of the output of the hysteresis comparator 20. However, the differences (1) to (3) above provide decisive differences in effect as will be described later.

The basic idea of the first preferred embodiment resides in the following point. That is to say, when the output voltage $v_o$ rises and reaches a defined voltage or higher, the hysteresis comparator 20 detects it and provides the output signal $V_{fo}$ to decrease the output voltage $A_{OUT}$ of the current amplifier 16 to or below the first level of the output waveform of the oscillator 17 or a level near the ground potential herein, whereby it forces only the operation of the switching element 7 in the active filter 100 into the OFF state. Subsequently, when the output voltage $v_o$ decreases to the reset voltage corresponding to the reset operation point $V_{ref2}$ set in the hysteresis comparator 20, the hysteresis comparator 20 detects this state and turns off the output $V_{fo}$ and applies it to the output end 67 of the current amplifier 16. This frees the output voltage $A_{OUT}$ from the level near the ground potential and causes the level to gradually increase from the near-ground level toward the first level. That is to say, the output voltage $A_{OUT}$ is raised in such a direction that the duty factor of the output waveform of the comparator 18 gradually increases from 0% to put the switching element 7 in the ON state again. The system of the first preferred embodiment is characterized in that this series of operations is automatically performed.

In contrast to the conventional circuit, this structure perfectly eliminates the need to restart the system by using the start switch circuit every time; when the output voltage $v_o$ is at an output voltage level slightly over the set value $v_{os}$, only the operation of the active filter can be automatically turned on/off inside the system while keeping the start switch circuit 22 in the ON state.

The circuit portion composed of the components 26, 27, 68, 22, and 23 in FIG. 2 is related only to the soft start (activation) of the negative feedback control circuit 300 and it can be realized with other circuit configuration; the circuit portion including these components does not form the substantial and essential part when realizing the above-described features of the system. Similarly, the diode 28 is not an essential part, either. This also applies to the systems shown in the following other preferred embodiment and modifications.

Figure 5:
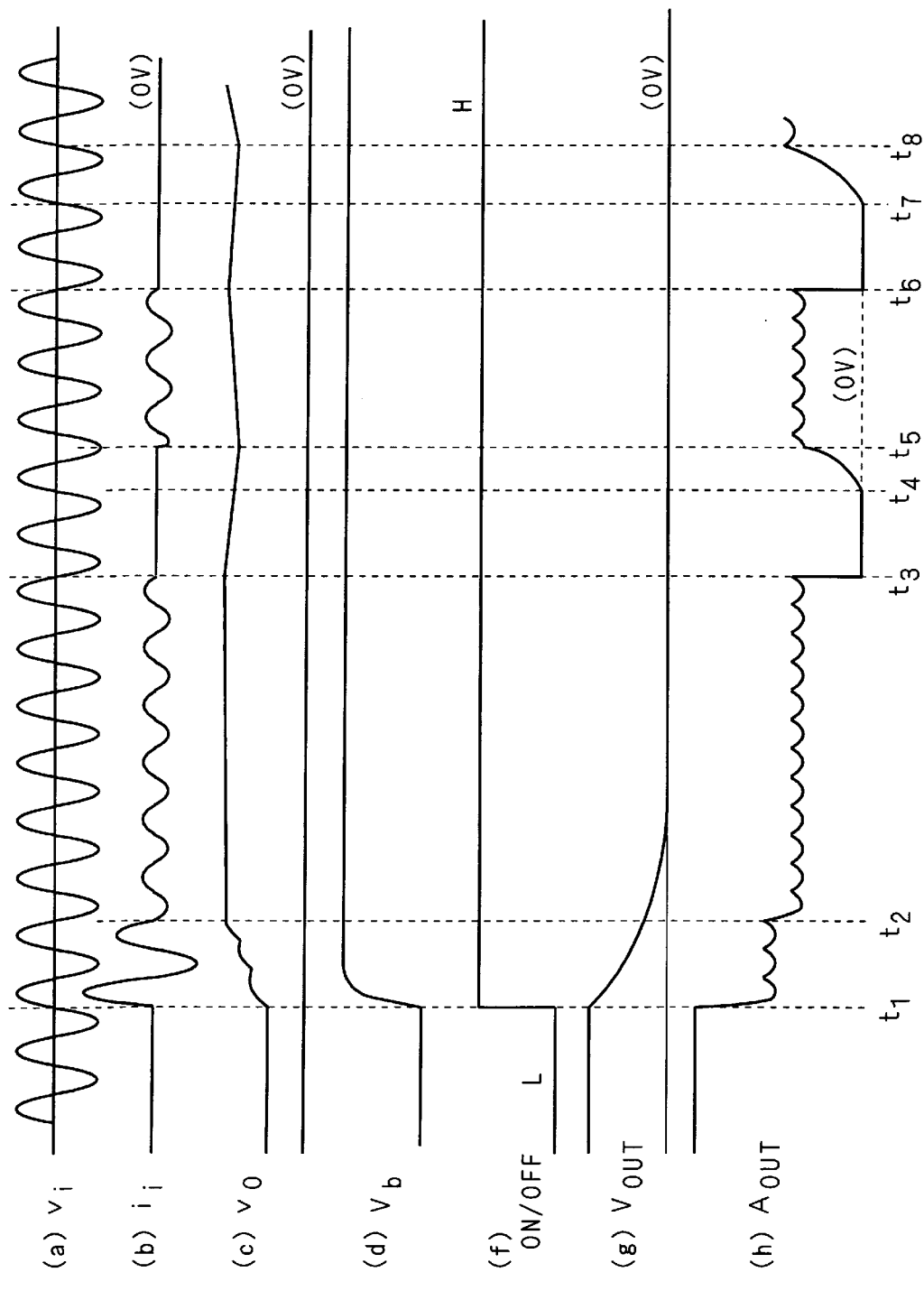
FIG. 5 is a timing chart showing waveforms at individual parts in the circuit of FIG. 2.

FIG. 5 is a timing chart showing output waveforms in the individual parts of the system shown in FIG. 2. In FIG. 5, the full-wave rectified waveform of the AC power-supply voltage $v_i$ in (a) and the waveform of the output voltage $A_{OUT}$ in (h) are synchronized with each other since the multiplier circuit 15 shown in FIG. 2 receives the full-wave rectified current signal $v_{i1}$. Now, referring to FIGS. 2 and 5, the operation of this system will be described in detail.

Before time $t_1$, the voltage across the terminals of the load capacitor 11 or the output voltage $v_o$ is charged to the voltage $\sqrt{2}$ times the effective value of the AC power-supply voltage $V_i$. When the load 10 is in the light load condition, the power-supply current $i_i$ is a small current, and when it is in the no-load condition, the current $i_i$ is zero. The output signals $V_{OUT}$ and $A_{OUT}$ both show the maximum output voltage.

At time $t_1$ in this state, when the activation command signal ON is inputted from the third input terminal 53 to turn on the start switch 22, the tenth signal line 68 is connected to the power supply 23 and the potential $V_b$ at the point b quickly rises to the power-supply voltage of the power supply 23 (about 3.0 V). As a result, current flows from the constant-current source 26 to the current amplifier 16 through the diode 28 and the output voltage $A_{OUT}$ shows the waveform having its peak voltage at 2.4 V as shown in (B) of FIG. 3; the duty factor of the output waveform of the comparator 18 becomes the maximum duty factor and the switching element 7 turns on/off in accordance with it. As a result, the maximum AC power-supply current $i_i$ flows and the current is supplied to the output of the active filter 100. This rapidly charges the load capacitor 11 and the output voltage $v_o$ keeps rising toward the output voltage set value $v_{os}$.

Then, at time $t_2$, the output voltage $v_o$ becomes the output voltage set value $v_{os}$ or more and the current $i_i$ flowing after that is minimized by the negative feedback control by the control circuit 300. After that, the load 10 enters the light load condition and the load capacitor 11 is gradually charged by the current corresponding to the current ii minus the current required by the load 10.

As a result, at time $t_3$, the charge voltage of the load capacitor 11 or the voltage occurring at the resistor 32 reaches the overvoltage set value 24 ($V_{ref1}$), and then the hysteresis comparator 20 operates into the ON state and outputs the output signal $V_{fo}$ at the ground potential level "0," which forces the potential at the output end 67 of the second differential amplifier or current amplifier 16 to fall to the vicinity of the ground potential level. As a result, the output voltage $A_{OUT}$ which had its valley voltage at the 1.4 V level ((C) in FIG. 3) is brought down to the vicinity of 0 V. Naturally, the potential at the connection point a becomes the valley voltage of the oscillation wave of the oscillator 17 (=2.0 V) or less, and the output of the comparator 18 enters the OFF state, in response to which the switching element 7 connected to the gate driver 19 comes in the OFF state. After that, the hysteresis comparator 20 continues the output of the overvoltage detect signal $V_{fo}$ at the "0" level or L level, so that the OFF state of the switching element 7 is maintained till time $t_4$.

After that, the output voltage $v_o$ gradually attenuates, and at time $t_4$, the output voltage $v_o$ or the voltage at the resistor 32 falls to the reset-voltage reference voltage $V_{ref2}$ set in the hysteresis comparator 20, and the hysteresis comparator 20 changes from the ON state to the OFF state and stops the output of the overvoltage detect signal $V_{fo}$ at the "0" level. Then the output $A_{OUT}$ of the current amplifier 16 is freed from the ground potential level and returns through the transition period $t_4$ to $t_5$ to the normal active filter operation level in the light-load situation or the output level having its valley voltage at 1.4 V as shown in (C) of FIG. 3.

At time $t_5$ at which the output voltage $v_o$ has fallen to the set value $v_{os}$, the voltage at the connection point a has the valley voltage at approximately 2 V and the duty factor of the output waveform of the comparator 18 is close to 0%. Hence the ON time of the switching element 7 is not very small, and as shown in (b) of FIG. 5, the current flowing to the output end 60 of the active filter 100 is much smaller than that shown in (b) of FIG. 15. That is to say, such large inrush current as shown in (b) of FIG. 15 depicting the conventional circuit does not flow in restart. Therefore the reactor 6 does not generate abnormal sound. The over-short of the output voltage $v_o$ seldom generates even if the load 10 is in the no-load condition.

After that, the output voltage $v_o$ gradually rises again and the output voltage $v_o$ reaches the overvoltage set value again at time $t_6$, and then only the operation of the active filter or only the switching element 7 stops, and the active filter 100 is put in the ON state again at time $t_7$.

In this way, according to the active filter of this preferred embodiment, it is not necessary to repeatedly turn on and off the activation of the control circuit 300 even when the load 10 moves from the heavy load condition to the light load or no-load condition, but the operation of only the active filter is automatically turned on and off in a stable manner. Furthermore, the operation is repeated between the preset two reference values: the overvoltage value $V_{ref1}$ and the reset voltage value $V_{ref2}$. At this time, unlike the conventional technique, the structure is completely free from generation of over current and generation of abnormal sound. Even if the load 10 largely changes from the light load or no-load condition in this period, the control circuit 200 only smoothly decreases the output voltage $v_o$ from the overvoltage value to the output voltage set value $v_{os}$, without causing any problem in the operation of the entire system, and the system operates to keep the output voltage $v_o$ of the active filter constant at the voltage $v_{os}$.

As described above, in this preferred embodiment, (i) the negative feedback control circuit 300 and (ii) the overvoltage detecting circuit 400, which controls the ON/OFF operation of the switching element 7 by detecting the output voltage $v_o$ rising to the overvoltage level or over when the load 10 is in the light load condition or the no-load condition and forcing the output voltage of the current amplifier 16 to the vicinity of the ground potential in response to the detection, are connected in parallel to each other with respect to the output terminal 60 of the active filter 100. This structure can stably and smoothly control the active filter output voltage $v_o$ within a constant range. Furthermore, while the constant and stable control to the active filter output voltage can be automatically performed within the system without causing excessive inrush current, the characteristics of the conventional active filter, i.e. the power factor of nearly 100% and control with remarkably suppressed harmonics, can be maintained since the structure of the basic circuit as an active filter or the main circuit 100 is the same as that of the conventional technique.

(Second Preferred Embodiment)

FIG. 6 is a block diagram showing the entirety of an active filter system according to a second preferred embodiment. While FIG. 6 also shows the microcomputer 500 as an external device of the system, the main part of this system is composed of the main circuit 100 as the active filter, the AC power supply 1, the input signal line 50 including the noise filter 25, the output end 51, the load 10, and the control circuit 200, similarly to that described in the first preferred embodiment. However, the objects of the system of this preferred embodiment include: (1) while basically maintaining the functions realized in the first preferred embodiment, (2) adapting the functions also to the PAM control, so that the structure of the control circuit 200 differs from that of the first preferred embodiment. In other respects, the components are the same as those in the first preferred embodiment and therefore the structure of the main circuit 100 is also the same as that in the conventional technique (see FIG. 13).

Now the structure of this system will be described mainly about differences from the first preferred embodiment.

As shown in FIG. 6, although the input end of the overvoltage detecting circuit 400 is connected to the connection point "c" between a first resistor 36 and a second resistor 37 for dividing the output voltage in the negative feedback control circuit 300, the function of the circuit 400 is the same as that of the first preferred embodiment as will be understood from the description given below. That is to say, also in this system, the circuit 400 receives a signal giving the output voltage or a signal corresponding to the output voltage, and makes the first comparison corresponding to a comparison between the output voltage and the overvoltage level higher than that by a given level by comparing the signal corresponding to the output voltage and the overvoltage level reference voltage; when the output voltage reaches or exceeds the overvoltage level, it outputs the overvoltage detect signal $V_{fo}$ and maintains the output of the signal $V_{fo}$ until the output voltage falls to reach the reset level, and when the output voltage reaches the reset level, it stops the output of the signal $V_{fo}$. The level of the signal $V_{fo}$ is the same as that in the first preferred embodiment, which is not higher than the valley voltage (=2.0 V) of the oscillation waveform of the oscillator 17 described before. The difference between the overvoltage level and the output voltage set value $v_{os}$ is determined by the set value 24 in the overvoltage detecting circuit 400, which takes a value in the range of 10 V to 20 V including variations in design. The difference between the reset level and the output voltage set value $v_{os}$ is also set at a constant value by the reference value $V_{ref2}$ in the circuit 400 (herein about 5 V).

Figure 7:
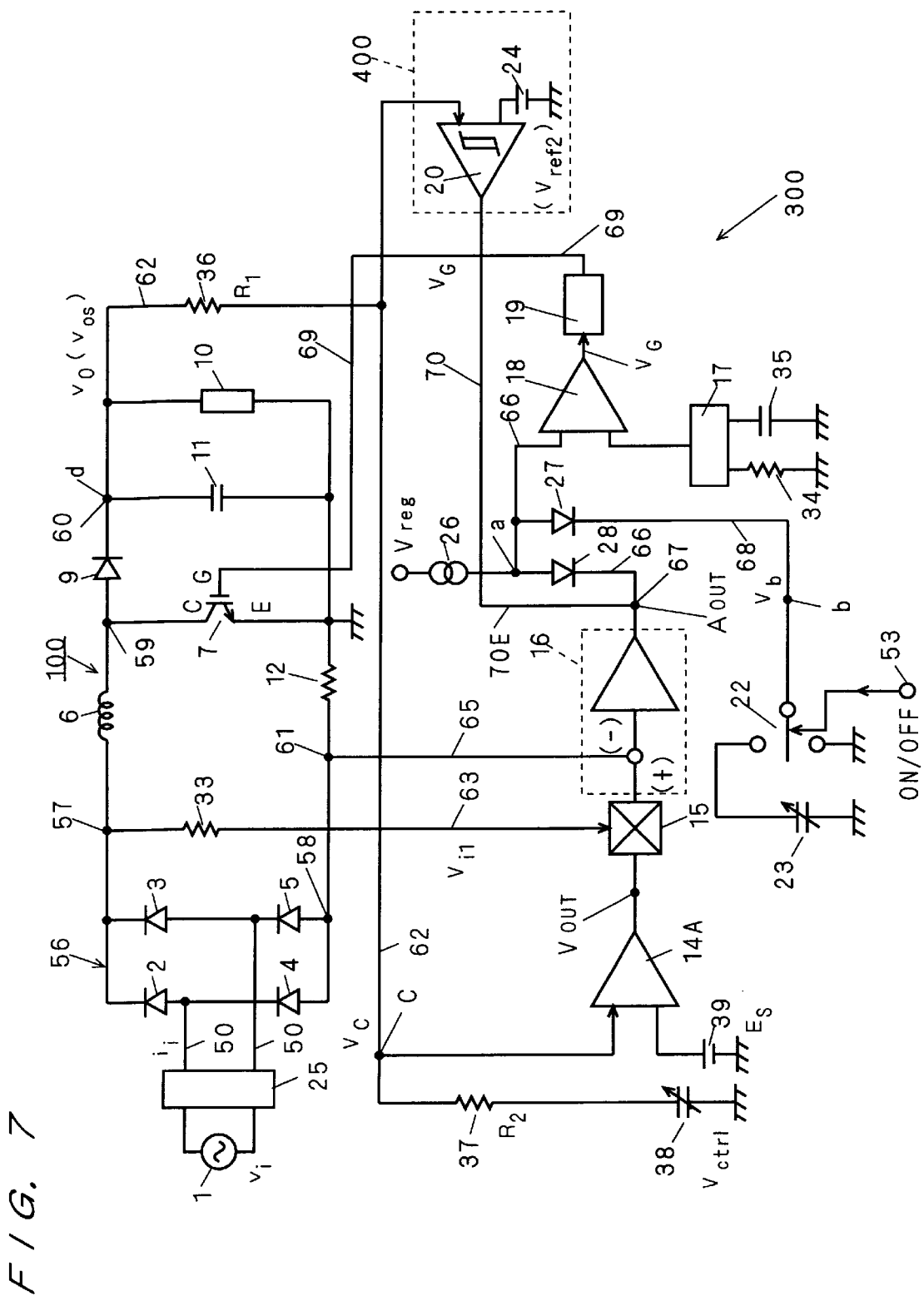
FIG. 7 is a circuit diagram showing a specific structure of the active filter system of the second preferred embodiment.

FIG. 7 shows the structure of this system in greater detail. Those shown in FIG. 7 by the same reference characters as those in FIG. 2 show the same components. The main circuit 100 includes the converter diodes 2 to 5, reactor 6, switching element 7 (for example, transistor, IGBT, MOSFET, etc.), current diode 9, load 10, load capacitor 11, and current detecting resistor 12.

For components different from those in the first preferred embodiment, the negative feedback control circuit 300 for controlling the main circuit 100 includes: (1) a first resistor 36 having its one end connected to the output end 51 (60) of the main circuit 100, (2) a second resistor 37 having its one end connected to the other end "c" of the first resistor 36, (3) a control power supply 38 connected to the other end of the second resistor 37 and having a DC power-supply value $V_{ctrl}$ that can be variably set, (4) a first differential amplifier circuit or voltage amplifier 14A having its negative input end connected to the other end c of the first resistor 36 and receiving a given reference voltage $E_s$ of the reference voltage source 39 at its positive input end, for comparing the level at the other end c of the first resistor 36 and the reference voltage $E_s$ to output the differential signal $V_{OUT}$, and (5) a multiplier circuit 15 having its first input end connected to the output end of the first differential amplifier circuit 14A and its second input end connected to the first output end 57 of the full-wave rectifying circuit 56 through the third resistor 33, for multiplying together the output signal $V_{OUT}$ of the first differential amplifier circuit 14A and the full-wave rectified current signal $V_{i1}$.

The circuit 300 also includes, as components common to those in the first preferred embodiment, the current amplifier or second differential amplifier circuit 16, triangular-wave oscillator 17, comparator 18, gate driver 19, diodes 27 and 28, constant-current source 26, start switch 22, soft start DC power supply 23, third input terminal 53, sixth signal line or overvoltage detect signal line 70 connected to the output end of the overvoltage detecting circuit 400 as the second input terminal, control signal output line 69 as the fifth signal line, activating signal line 68 as the tenth signal line, and second differential amplifier circuit output signal line 66 as the fourth signal line. Also in this system, the starting voltage commanding the activation can be varied with the power-supply voltage of the activation power supply 23 and the active filter operation is soft-started. The reference character 34 denotes a resistor and 35 denotes a capacitor; the resistor 34 and the capacitor 35 determine the oscillation frequency of the oscillator 17 (like that in the circuits shown in the first preferred embodiment and FIG. 15, it is determined by the performance of the switching element 7 and the like in the range of 10 kHz to 50 kHz herein).

As stated above, the control power supply 38 determines the set value of the DC output voltage $v_o$ of the active filter 100.

In FIG. 7, the reference character $V_{reg}$ shows a power supply, the nodes a, b, c, d are defined for convenience in the description, $V_{ctr1}$ shows the DC power-supply value of the control power supply 38, and $E_s$ shows the reference voltage value applied to the voltage amplifier 39. The reference character $E_c$ shows the voltage value of the voltage source 24 which determines the trip operation point of the hysteresis comparator 20 (which corresponds to the overvoltage level). The reference characters $R_1$ and $R_2$ show the resistance values of the first and second resistors 36 and 37, respectively.

Next, the operation principle of this system will be described in detail.

Here, when the DC output voltage of the active filter 100 is represented as $v_o$, then the current flowing to the control power supply 38 is given by $$I_{ctrl} = \frac{(v_o - V_{ctrl})}{(R_1 + R_2)} \quad \text{eq. (1)}$$

Accordingly the potential $V_c$ at the node c is given by $$V_c = V_{ctrl} + \frac{(v_o - V_{ctrl})}{(R_1 + R_2)} \times R_2 \quad \text{eq. (2)}$$

This value $V_c$ is compared with the reference voltage $E_s$ of the voltage amplifier 14A, and the entire active filter is controlled so that no difference is produced. That is, $$E_s = V_{ctrl} + \frac{(v_o - V_{ctrl})}{(R_1 + R_2)} \times R_2 \quad \text{eq. (3)}$$

$$= \frac{R_2}{(R_1 + R_2)} \times v_o + \frac{R_1}{(R_1 + R_2)} \times V_{ctrl}$$

Hence the output voltage $v_o$ is given as $$v_o = \left(\frac{R_1}{R_2} + 1\right) \cdot E_s - \left(\frac{R_1}{R_2}\right) \cdot V_{ctrl} \quad \text{eq. (4)}$$

For example, when the reference voltage $E_s$ is 2.5 V and $R_1$=940 kΩ and $R_2$=6.2 kΩ then the output voltage $v_o$ is given as $v_o$=381.5−151.6 $V_{ctrl}$.

Figure 8:
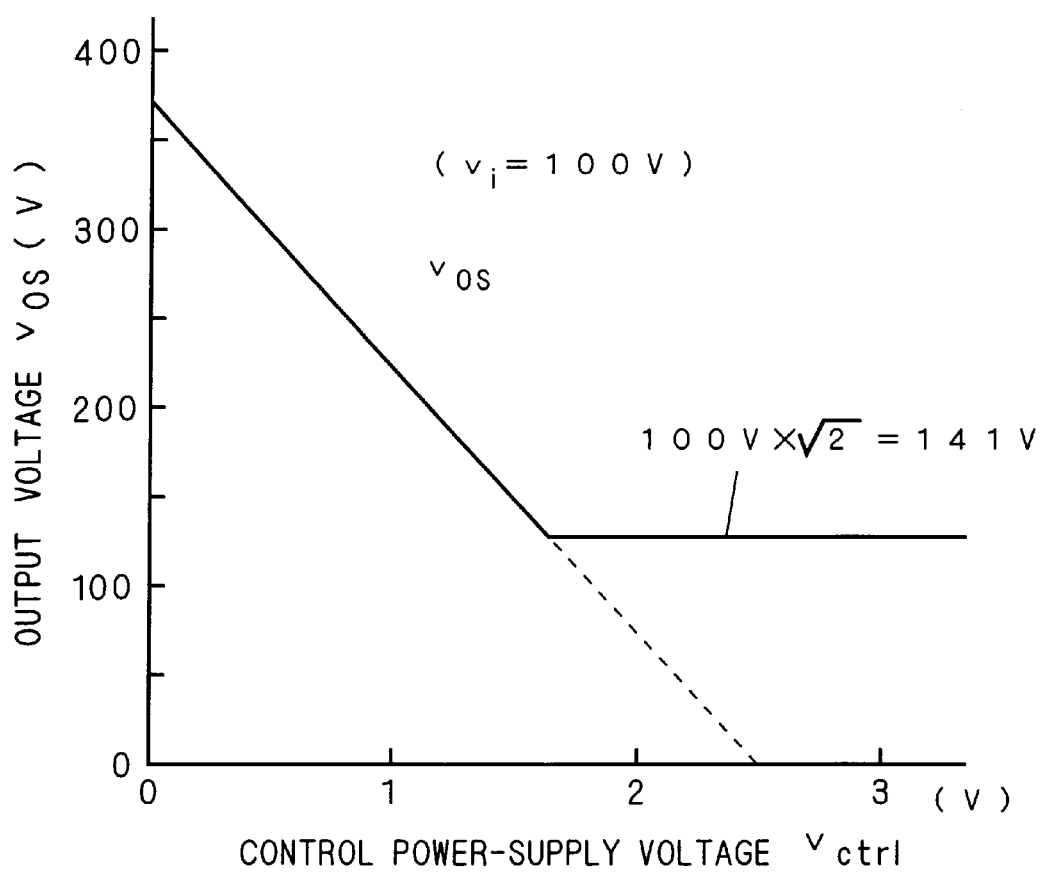
FIG. 8 is a diagram showing the relation between the control power-supply voltage and the DC output voltage.

This relation can be represented in a graph as shown in FIG. 8.

The equation (4) can be applied to realize the operation of a boosting active filter adapted to the PAM control and having variable output voltage. That is to say, as shown by the broken line in FIG. 8, the equation cannot be applied in the range in which the output voltage $v_o$ is the peak voltage of the AC power supply 1 or below, e.g. in the range of 100×$\phi\sqrt{2}$=141 V and below if the effective value of the AC power-supply voltage $V_i$ is 100 V, but the voltage $V_c$ is equal to the reference voltage $E_s$ under the condition in which the voltage $V_c$ at the node c is controlled constant even if the output voltage $v_o$ varies. Accordingly, when this voltage $V_c$ at the node c is supplied as the input signal to the hysteresis comparator 20, the input signal to the hysteresis comparator 20 is not varied even if the set value $v_{os}$ of the output voltage $v_o$ is changed by changing the voltage $V_{ctrl}$, and it varies by the rise of the output voltage $v_o$ caused as the load 10 the two reference voltages $V_{ref1}$ and $V_{ref2}$ to be set for the hysteresis comparator 20 can be kept constant even if the set value $v_{os}$ of the output voltage $v_o$ is varied, and the amount of variation of the output voltage $v_o$ can be always controlled within a given range despite the variation of the output voltage set value $v_{os}$. This preferred embodiment utilizes this point.

Figure 9:
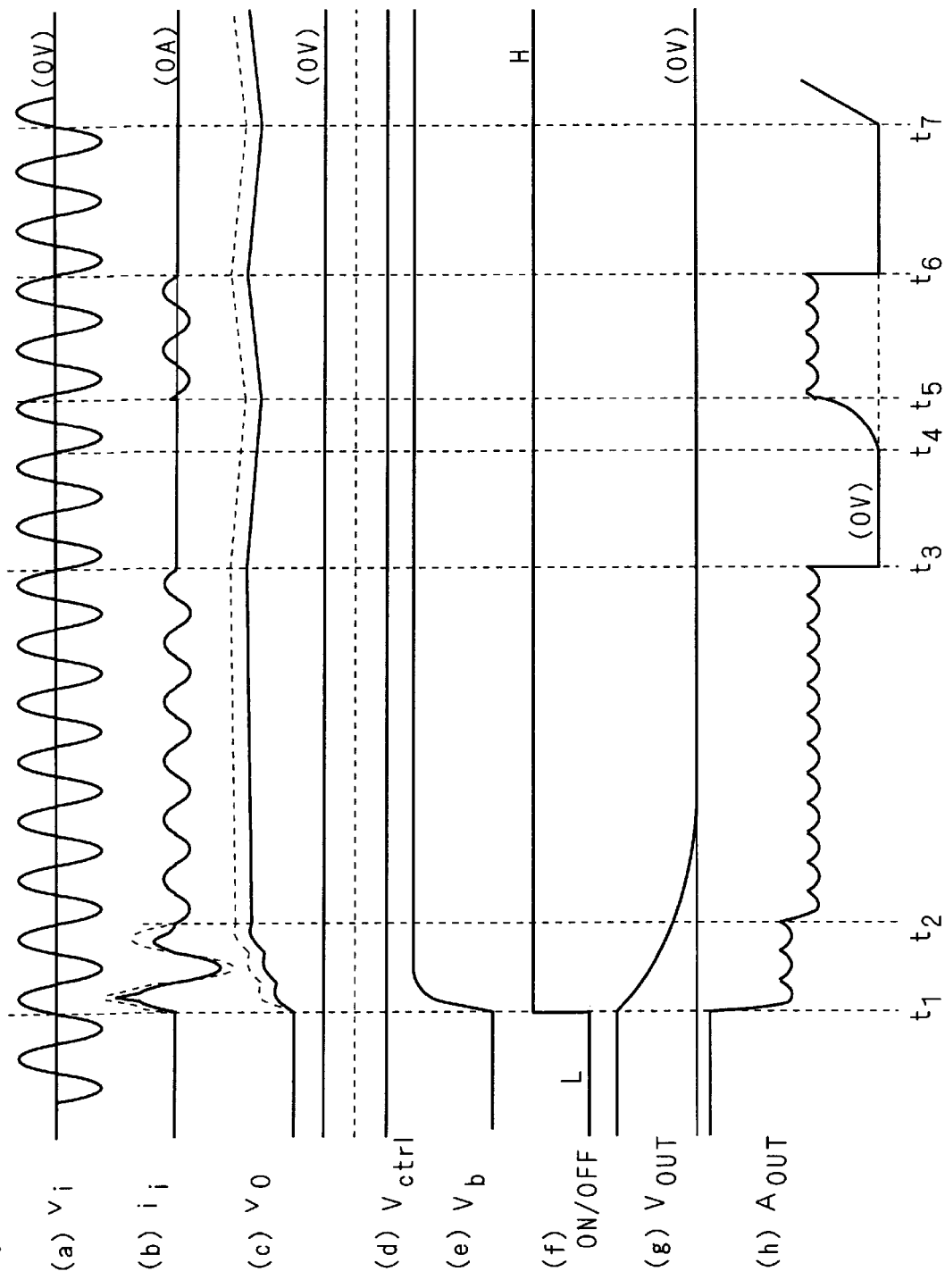
FIG. 9 is a timing chart showing modifications at individual parts in the circuit of FIG. 7.

FIG. 9 is a timing chart showing output waveforms in the individual portions in the system of this preferred embodiment. Its operation will be described in detail referring to this waveform diagram.

In FIG. 9, the character $V_i$ shows the voltage waveform of the AC power supply 1. The reference character $i_i$ shows the current waveform flowing through the AC power supply 1. The character $v_o$ shows the DC output voltage of the active filter 100, which shows the potential at the connection point "d" in FIG. 7. In FIG. 9, (b) to (d) each show two waveforms represented by a solid line and a dotted line to clearly show how the output waveforms in each portion vary when the control voltage $V_{ctrl}$ of the control power supply 38 is changed between the solid-line and dotted-line waveforms, particularly to show that the difference between the output voltage $v_o$ and its set value $v_{os}$ is always kept constant. For example, the output waveforms at the individual parts exhibited when $V_{ctrl}$=0.86 V and DC output voltage $v_o$=250 V are given by the solid lines and the output waveforms with $V_{ctrl}$=0.538 V and DC output voltage $v_o$=300 V are given by the dotted lines. In FIG. 9, (e) shows the voltage waveform at the point b in FIG. 7. In FIG. 9, (f) shows the waveform of the signal ON/OFF and therefore the operation of the start switch 22.

Herein, to activate the active filter 100 at time $t_1$, the activation command signal ON is received from the external microcomputer 500 to turn on the start switch 22 and the power-supply voltage 23 for activation is applied to the point b through the start switch 22. This causes the voltage at the point b to rise from the ground-level potential, and the potential at the connection point a goes to the valley voltage at 2 V (the first level) of the voltage waveform of the triangular wave outputted from the oscillator 17 or more, and thus the active filter 100 starts.

In response to the start operation of the start switch 22, the potential of the output signal $V_{OUT}$ of the voltage amplifier 14A attenuates from the maximum voltage toward 0 V. Accordingly the potential of the output signal $A_{OUT}$ of the current amplifier 16 also falls from the maximum voltage in response to the starting operation of the start switch 22, and then a current flows from the constant-current source 26 to the output end of the current amplifier 16 through the diode 28. Then the potential at the point a shows the AC waveform having its peak voltage at about 3.0 V and therefore the output signal $A_{OUT}$ shows the AC waveform having its peak voltage at about 2.4 V which is lower than the potential at the point a by the voltage drop (0.6 V) of the diode 28. The active filter 100 thus starts and a relatively large current $i_i$ flows to the AC power supply 1 first; the current flows into the load capacitor 11 until the DC output voltage $v_o$ reaches the voltage $v_{os}$ set by the control voltage $V_{ctrl}$ and charges the capacitor 11. The time required for the output voltage $v_o$ to reach the set voltage $v_{os}$ is the time $t_2$ here.

After time $t_2$, a current that the load 10 requires flows at least. If the load 10 is in the light load or no-load condition, the current $i_i$ flowing through the AC power supply 1 is rapidly decreased. Accordingly the voltage of the output signal $A_{OUT}$ decreases to minimize the duty factor of the output waveform of the comparator 18. The waveform of (h) in FIG. 9 in time $t_2$ to $t_3$ shows this state. That is to say, the output signal $A_{OUT}$ exhibits the waveform having its valley voltage at 1.4 V as shown in (c) in FIG. 3. However, if the current $i_i$ which flows when the duty factor of the output waveform of the comparator 18 is minimized is equal to the current which the load 10 requires or more, the difference charges the load capacitor 11. As a result, the load capacitor 11 is gradually charged and the voltage $v_o$ across the terminals gradually rises. The condition during the rising time or the period between time $t_2$ to time $t_3$ is beyond the original control range of the active filter for controlling the DC output voltage $v_o$ constant. That is to say, while the voltage at the node c is approximately equal to the reference voltage $E_s$ of the voltage amplifier 14A when the DC output voltage $v_o$ is controlled to the given set value $v_{os}$, the voltage at the point c gradually rises from the reference voltage $E_s$ in the period between time $t_2$ to time $t_3$. This is because the DC output voltage $v_o$ gradually rises high.

When, at time t3, the voltage $V_c$ at the point c reaches the voltage E, of the voltage source 24 which determines the trip operation point, the hysteresis comparator 20 operates into the ON state because the potential $V_c$ at the point c is captured into the input end of the hysteresis comparator 20, and the comparator 20 forces the potential at the output end of the current amplifier 16 or the output signal $A_{OUT}$ to drop to the vicinity of the ground level. In (h) of FIG. 9, the voltage waveform of the output signal $A_{OUT}$ at time $t_3$ shows this state. Then the duty factor of the output waveform of the comparator 18 becomes 0% to turn off the switching element 7 and the active filter 100 stops. Then the charging of the load capacitor 11 is stopped and the charge charged in the load capacitor 11 is gradually discharged.

At time $t_4$, the potential $V_c$ at the point c reaches the reset level $V_{ref2}$ of the hysteresis comparator 20, and the hysteresis comparator 20 turns from the ON state to the OFF state. Then the output end of the current amplifier 16 is freed from the ground level and the voltage of the output signal $A_{OUT}$ gradually rises from the ground level; when the output voltage $v_o$ reaches the set value $v_o$, at time $t_5$, the comparator 18 starts controlling the switching element 7 on the basis of the duty factor of its output waveform again. If the load 10 is in the light load or no-load condition at this time, the comparator 18 minimizes the duty factor of the output waveform and a small current flows through the AC power supply 1. Then the load capacitor 11 is charged again and the DC output voltage $v_o$ gradually rises. When the output voltage $v_o$ reaches the overvoltage level at time $t_6$, only the active filter 100 stops again. The activation command signal ON is kept inputted in this period.

In this way, only the active filter 100 can be automatically stopped and started within the system without supply of external stop command so that the output voltage $v_o$ can be kept inside a value slightly higher than the voltage of the currently set value $vo_{os}$, e.g. within a range determined by the set value and a level higher than the set value by about 10 V to 5 V. Furthermore, unlike the conventional technique, large AC current does not flow to cause abnormal sound when restarting the active filter. In this system, when the load 10 becomes heavy from the light load or no-load condition, the output voltage $v_o$ immediately varies to the set value $v_{os}$. When the load 10 becomes heavy, the hysteresis comparator 20 is in the standby state without operating, and the active filter is controlled to operate with high power factor and suppressed harmonic content.

Now we consider a condition in which the set value $v_{os}$ of the DC output voltage $v_o$ is set to a higher value by varying the control power-supply voltage $V_{ctrl}$. For example, suppose that $v_o$=300 V and $V_{ctrl}$=0.538 V. The dotted-line waveforms shown in FIG. 9 show the operation waveforms in this case.

The output voltage $v_o$ reaches the set value 300 V at time $t_2$. After that, if the load 10 is in the light load or no-load condition, the output voltage $v_o$ rises as described above. When, at time $t_3$, the potential $V_c$ at the point c reaches the voltage $E_c$ of the trip operation point of the hysteresis comparator 20 (which corresponds to the overvoltage level), the comparator 20 turns on to cause the output $A_{OUT}$ of the current amplifier 16 to drop to the ground level, and the comparator 18 turns off to turn off the switching element 7, and the active filter 100 stops.

In this way, this system performs the same operation as the series of operations described above even when the output voltage set value $v_{os}$ is increased to 300 V. That is to say, the ON/OFF operation of the hysteresis comparator 20 is equivalent to operation performed at levels higher than the output voltage set value 300 V by 10 V to 5 V. This advantage can be obtained because this system compares the potential $V_c$ at the point c and the reference voltages $E_c$ and $V_{ref2}$, as described above.

Even if the output voltage set value $v_{os}$ is changed in the range of 250 V to 300 V, the trip operation point and the reset operation point do not change. That is to say, when the output voltage set value $v_{os}$ is set at 250 V and when the two operation points of the hysteresis comparator 20 are set so as to make it operate at the levels higher than the set value 250 V by 10 V (corresponding to the overvoltage level) to 5 V (corresponding to the reset level), and then, even when the output voltage set value $v_{os}$ is changed to 300 V later, the hysteresis comparator 20 performs the ON/OFF operation at the levels higher than the set value 300 V by 10 V (corresponding to the overvoltage level) to 5 V (corresponding to the reset level), whereby the overvoltage protection operation can follow the output voltage. In this system, unlike the first preferred embodiment, the voltage value which is directly compared with the output voltage to see whether the output voltage has reached the overvoltage level is not a fixed value (however, the reference voltage value set for the hysteresis comparator is constant). Accordingly, even if the load varies, the output voltage $v_o$ can be stably controlled within an almost constant range from the present set value $v_{os}$ over the entire variation range of the DC output voltage $v_o$. As stated above, the PAM control requires maximum efficiency and energy-saving control with freely changed DC output voltage $v_o$. Accordingly, the active filter of this preferred embodiment is the most suitable as a power supply device for use with the PAM control.

(Modification of the Second Preferred Embodiment)

Figure 10:
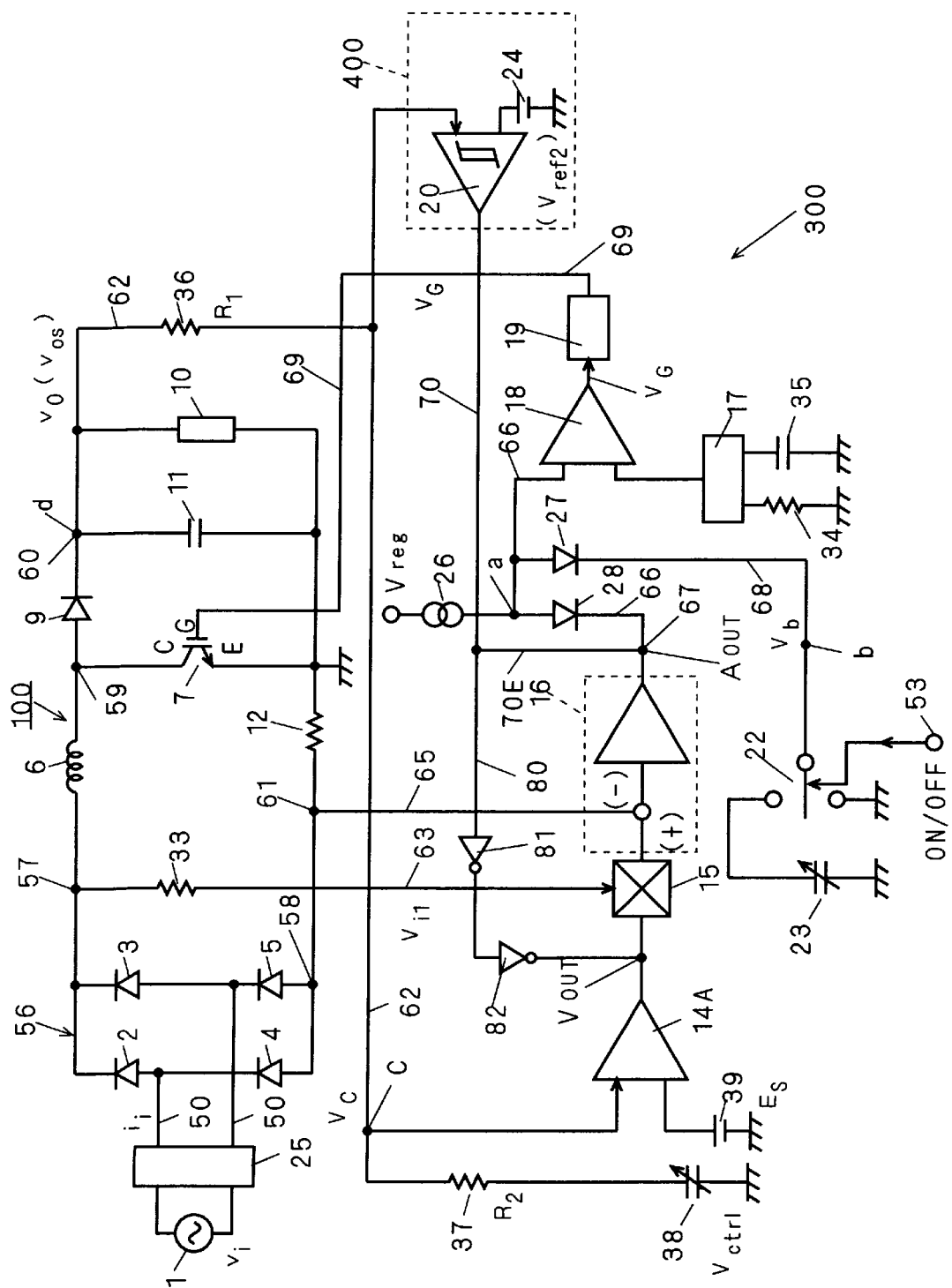
FIG. 10 is a circuit diagram showing an active filter system according to a modification of the second preferred embodiment.

FIG. 10 is a circuit diagram showing an active filter system according to a modification of the second preferred embodiment. The circuit shown in FIG. 10 differs from the circuit shown in FIG. 7 in that the output end of the hysteresis comparator 20 is connected not only to the output end 67 of the current amplifier 16 but also to the output end of the voltage amplifier 14A.

With this connection, even if the set value $v_{os}$ of the DC output voltage $v_o$ is set between the trip operation point $V_{ref1}$ (it is the reference value corresponding to the overvoltage level) of the hysteresis comparator 20 and the reset operation point $V_{ref2}$ (it is the reference value corresponding to the reset level), excessive current does not flow at all (therefore abnormal sound is not produced) when the active filter 100 is automatically activated and stopped within the system as the load moves to the light load or no-load condition and the output voltage $v_{os}$ rises, which realizes stable active filter operation.

Figure 11:
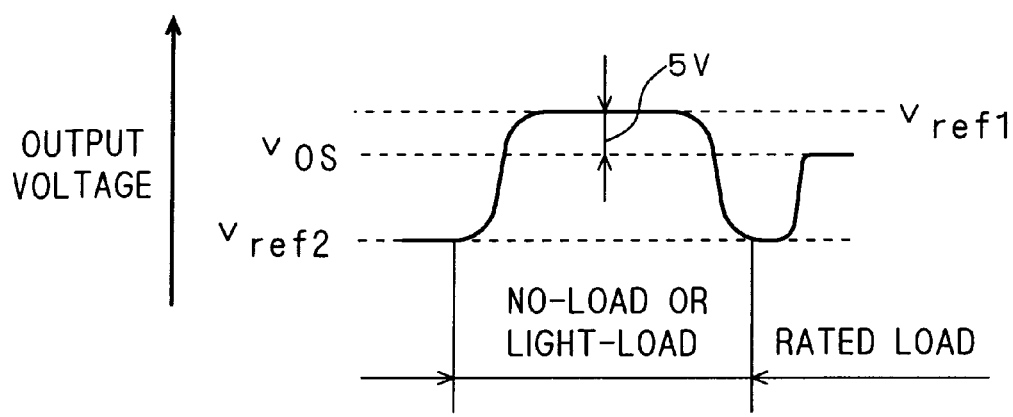
FIG. 11 is a diagram showing the point of the modification shown in FIG. 10.

That is to say, as shown in FIG. 11, for example, when the trip operation point $V_{ref1}$ is set at a level higher than the output voltage set value $v_{os}$ by 5 V so that the variation of the output voltage $v_o$ with respect to the set value $v_{os}$ can be controlled to be still smaller, the reset operation point $V_{ref2}$ of the hysteresis comparator 20 must be set smaller than the output voltage set value $v_{os}$. Referring to the circuit shown in FIG. 7 from this standpoint, the input signal to the current amplifier 16 or the output $V_{OUT}$ of the voltage amplifier 14 is not 0 V even when the output end 67 of the current amplifier 16 is forced to the vicinity of the ground level by the output of the signal $V_{fo}$. Now, if the output $V_{OUT}$ can be set perfectly at 0 V, then the negative feedback is not effected and the output end voltage of the amplifier 16 becomes perfectly 0 V after the overvoltage condition is detected. When the output voltage $v_o$ falls below the set value $V_{os}$ and reaches the reset operation point $V_{ref2}$, the output end 67 of the current amplifier 16 is freed from 0 V and the potential at the output end 67 rises. Thus the functions and effects described in the first and second preferred embodiments can be obtained without causing a large current $i_i$ in this restarting operation. Furthermore, since the trip operation point $V_{ref1}$ can be set to a level higher than the set value $v_{os}$ by a smaller value, e.g. about 5 V, the output voltage $v_{os}$ can be controlled constant more stably.

From this point of view, in the circuit of FIG. 10, the output end of the first differential amplifier 14 is connected also to the other end 70E of the overvoltage detect signal line 70 through the seventh signal line 80 including two inverter circuits 81 and 82. In this structure, the two output signals $V_{OUT}$ and $A_{OUT}$ fall to the vicinity of the ground potential level together only when the hysteresis comparator 20 outputs the signal $V_{fo}$.

When the signal line 70 is defined as "a first overvoltage detect signal line," the seventh signal line 80 can be defined as "a second overvoltage detect signal line" since the seventh signal line 80 also transfers the overvoltage detect signal without changing its level.

(Modification Common to the First and Second Preferred Embodiments)

The first and second preferred embodiments have used a single-phase AC power supply as the power source. However, an active filter for use with a three-phase AC power supply can be constructed by using the active filter 100 and the control circuit 200 described in the preferred embodiments.

Figure 12:
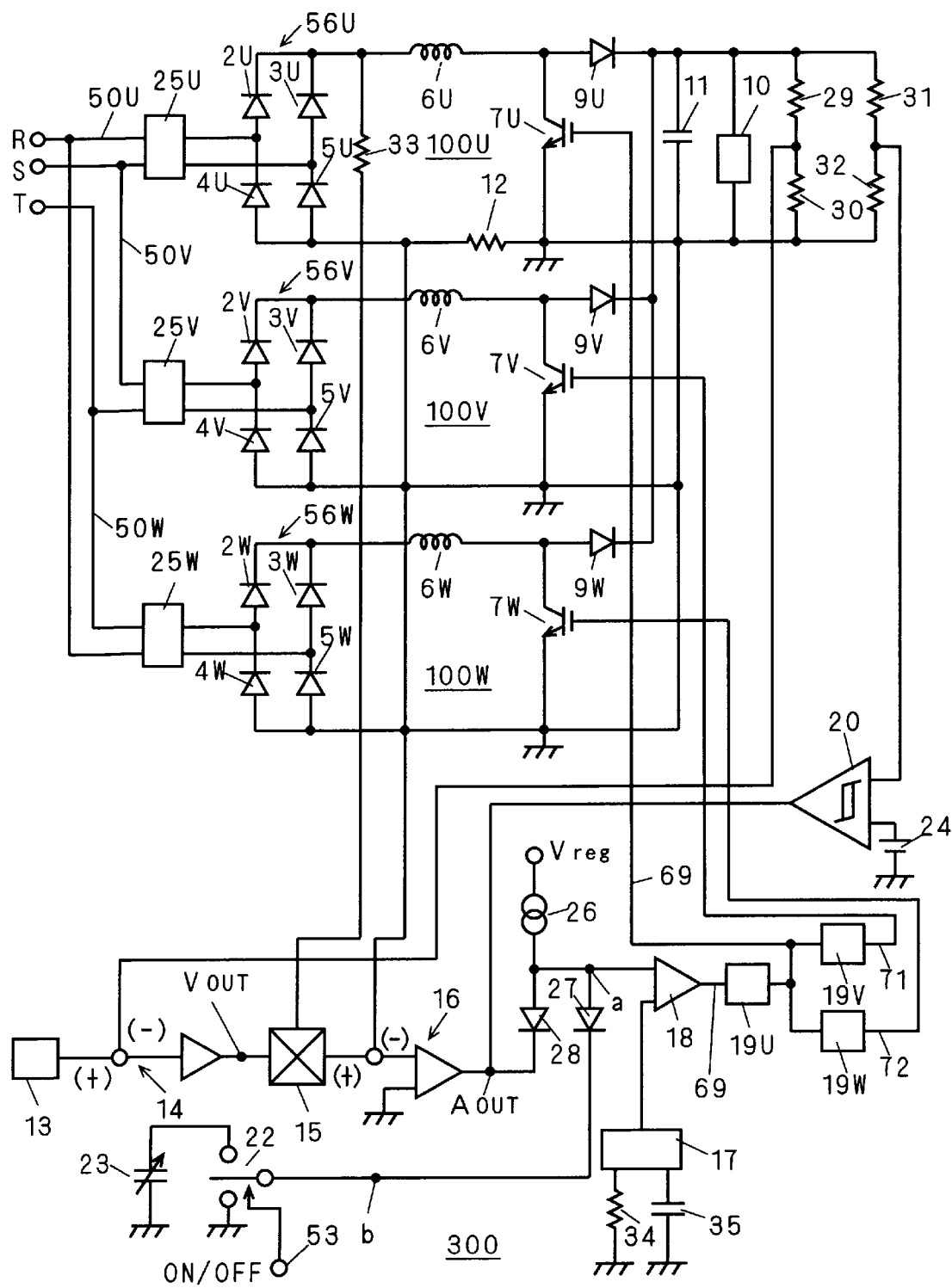
FIG. 12 is a circuit diagram showing an example of application of the invention to a three-phase AC power supply.

FIG. 12 shows an example of an active filter system using a three-phase AC power supply as the power source, which uses the active filter control device of the first preferred embodiment. Active filters for three phases which are constructed on the basis of the active filter for use with a single-phase AC power supply are respectively connected to the three-phase AC power-supply terminals R, S, T (the ends R, S, T correspond to output terminals of first, second, and third AC power supplies that differ in phase by 120 degrees from each other, respectively). The active filter 100U (a first main circuit) for U phase is a single-phase active filter having entirely the same structure as that described in the first preferred embodiment. In contrast, in the V-phase active filter 100V (a second main circuit), the main circuit construction does not include a component corresponding to the U-phase current detector 12, and the main circuit construction in the W-phase active filter 100W (a third main circuit) does not include a component corresponding to the U-phase current detector 12, either. That is to say, the active filter system using a three-phase AC power supply as the input power source has the active filter control device 300 only for the U-phase active filter 100U, in which, from the ON/OFF pulse (a first control signal) $V_G$ applied to the first switching element 7U, the delay drivers 19V and 19W produce second and third control signals whose phases (AC power supply) are respectively delayed by 120 degrees and 240 degrees, respectively, and the second and third control signals are respectively applied to the second and third switching elements 7V and 7W of the V-phase and W-phase.

The same basic idea can be applied to the active filter control device of the second preferred embodiment. That is to say, the control circuit 200 shown in FIG. 7 or FIG. 10 described in the second preferred embodiment is applied only to the U-phase active filter of FIG. 12 and the switching elements for V-phase and W-phase are supplied with the second and third control signals produced by delaying the phase of the first control signal outputted from the circuit 200 by 120 degrees and 240 degrees.

In FIG. 12, the reference characters 19V and 19W respectively denote the second and third gate drivers for respectively delaying the phase of the first control signal $V_G$ by 120 degrees and 240 degrees, and the reference characters 71 and 72 denote eighth and ninth signal lines, respectively.

The load in this invention includes a general-purpose inverter, AC servomotor, DC-DC inverter, etc. which are generally used in household electric appliances.

Accordingly, the input power supply can be an AC power supply or a DC power supply in the invention. The present invention can be used as a boosting AC-DC converter circuit or DC-DC converter circuit, i.e. as a power-supply circuit for various electric apparatuses.

While the features of the present invention have been described in detail referring to the drawings, it is understood that these techniques just illustrate one aspect of the modes of the invention. The features of the invention are not limited to the contents described above but numerous other modifications and variations can be devised without departing from the scope of the invention.

What is claimed is:

1. A boosting active filter system comprising:

a power supply;

an input signal line for input of a power-supply voltage of said power supply;

a load, and a main circuit having its input end connected to said input signal line and its output end connected to said load, converting said power-supply voltage to a DC voltage and outputting said DC voltage as an output voltage, wherein said main circuit comprises:

a full-wave rectifying circuit connected to said input signal line;

a reactor having its first end connected to a first output end of said full-wave rectifying circuit;

a rectifier diode having its anode electrode connected to a second end of said reactor and its cathode electrode connected to said output end of said main circuit;

a load capacitor having its first end connected to said output end of said main circuit and its second end grounded;

a switching element having its first main electrode connected to said second end of said reactor and its second main electrode connected to said second end of said load capacitor, performing ON operation when a control voltage applied to its control electrode is at an ON level and performing OFF operation when said control voltage is at an OFF level, and a current detecting resistor having its first end connected to said second main electrode of said switching element and its second end connected to a second output end of said full-wave rectifying circuit, said boosting active filter system further comprising:

an overvoltage detecting circuit receiving a signal giving said output voltage and making a comparison between said output voltage and an overvoltage level which is higher than a set value of said output voltage by a given level to output an overvoltage detect signal from its output end when said output voltage rises to said overvoltage level, and a negative feedback control circuit comprising a first input end connected to said output end of said main circuit and a second input end connected to said output end of said overvoltage detecting circuit, controlling a duty factor of said control voltage to said switching element on the basis of negative feedback of said output voltage when said overvoltage detect signal is not provided as its input, and controlling said duty factor of said control voltage to 0% to force said switching element into the OFF state when said overvoltage detect signal is provided as its input.

2. The boosting active filter system according to claim 1, wherein said overvoltage detecting circuit further makes a comparison between a reset level lower than said overvoltage level and said output voltage, and maintains output of said overvoltage detect signal until said output voltage which has risen to said overvoltage level falls to said reset level and stops said output of said overvoltage detect signal when said output voltage reaches said reset level, and said negative feedback control circuit keeps controlling said duty factor of said control voltage at said 0% while said overvoltage detect signal is being provided as its input.

3. The boosting active filter system according to claim 2, wherein said negative feedback control circuit comprises:

a first signal line transferring said output voltage;

a voltage setting circuit outputting an output voltage set value signal which gives said set value of said output voltage as a given value;

a first differential amplifier circuit having its negative input end connected to an output end of said first signal line and its positive input end connected to an output end of said voltage setting circuit;

a second signal line having its one end connected to said first output end of said full-wave rectifying circuit, and transferring a full-wave rectified current signal which gives a full-wave rectified current;

a multiplier circuit having its input ends connected to an output end of said first differential amplifier circuit and an other end of said second signal line, and multiplying an output signal of said first differential amplifier circuit and said full-wave rectified current signal together;

a third signal line having its one end connected to said second end of said current detecting resistor;

a second differential amplifier circuit having its negative input end connected to an other end of said third signal line and its positive input end connected to an output end of said multiplier circuit;

a fourth signal line having its one end connected to an output end of said second differential amplifier circuit;

an oscillator generating a signal which is at a given frequency and has a given waveform having its valley voltage at a first level and its peak voltage at a second level;

a comparator having its first input end connected to an other end (a) of said fourth signal line and its second input end connected to an output end of said oscillator, outputting said control voltage having said duty factor equal to said 0% when a signal at said other end of said fourth signal line is equal to said first level, outputting said control voltage having said duty factor equal to 100% when said signal at said other end of said fourth signal line is equal to said second level, and varying said duty factor in proportion to said signal at said other end of said fourth signal line when said signal at said other end of said fourth signal line is larger than said first level and smaller than said second level;

a fifth signal line having its one end connected to an output end of said comparator and its other end connected to said control electrode of said switching element, and a sixth signal line having its one end connected to said output end of said overvoltage detecting circuit and its other end connected to said output end of said second differential amplifier circuit, and wherein said overvoltage detecting circuit outputs said overvoltage detect signal at such a given level as to bring said signal at said other end of said fourth signal line to or below said first level.

4. The boosting active filter system according to claim 2, wherein said negative feedback control circuit comprise:

a first resistor having its one end connected to said output end of said main circuit;

a second resistor having its one end connected to an other end of said first resistor;

a control power supply connected to an other end of said second resistor and having a DC power-supply value capable of being variably set;

a first differential amplifier circuit having its negative input end connected to said other end of said first resistor, receiving a constant reference voltage at its positive input end, and comparing a level at said other end of said first resistor and said reference voltage to output a differential signal;

a multiplier circuit having a first input end connected to an output end of said first differential amplifier circuit and a second input end connected to said first output end of said full-wave rectifying circuit through a third resistor, and multiplying an output signal of said first differential amplifier circuit and a full-wave rectified current signal together;

a second differential amplifier circuit having its negative input end connected to said second end of said current detecting resistor and its positive input end connected to an output end of said multiplier circuit;

a second differential amplifier circuit output signal line having its one end connected to an output end of said second differential amplifier circuit;

an oscillator generating a clock which is at a given frequency and has a given waveform having its valley voltage at a first level and its peak voltage at a second level;

a comparator having its first input end connected to an other end of said second differential amplifier circuit output signal line and its second input end connected to an output end of said oscillator, outputting said control voltage having said duty factor equal to said 0% when a signal at said other end of said second differential amplifier circuit output signal line is equal to said first level, outputting said control voltage having said duty factor equal to 100% when said signal at said other end of said second differential amplifier circuit output signal line is equal to said second level, and varying said duty factor in proportion to said signal at said other end of said second differential amplifier circuit output signal line when said signal at said other end of said second differential amplifier circuit output signal line is larger than said first level and smaller than said second level;

a control signal output line having its one end connected to an output end of said comparator and its other end connected to said control electrode of said switching element, and an overvoltage detect signal line having its one end connected to said output end of said overvoltage detecting circuit and its other end connected to said output end of said second differential amplifier circuit, and wherein said overvoltage detecting circuit has its input end connected to said other end of said first resistor, and said overvoltage detecting circuit outputs said overvoltage detect signal at such a given level as to bring said signal at said other end of said second differential amplifier circuit output signal line to or below said first level.

5. The boosting active filter system according to claim 4, wherein said output end of said first differential amplifier circuit is also connected to said other end of said overvoltage detect signal line through a seventh signal line, and said given level of said overvoltage detect signal corresponds to ground potential.

6. The boosting active filter system according to claim 2, wherein said power supply is a single-phase AC power supply.

7. The boosting active filter system according to claim 6, wherein said power supply is defined as a first AC power supply, and said main circuit is defined as a first main circuit, said boosting active filter system further comprising:

a second AC power supply whose phase is shifted by 120 degrees with respect to said first AC power supply;

a third AC power supply whose phase is shifted by 240 degrees with respect to said first AC power supply:

a second input signal line inputting a second AC power-supply voltage of said second AC power supply;

a third input signal line inputting a third AC power-supply voltage of said third AC power supply;

a second main circuit having its input end connected to said second input signal line and its output end connected to said load, and converting said second AC power-supply voltage to a second DC voltage and outputting said second DC voltage as said output voltage, and a third main circuit having its input end connected to said third input signal line and its output end connected to said load, and converting said third AC power-supply voltage to a third DC voltage and outputting said third DC voltage as said output voltage, wherein said second main circuit comprises:

a second full-wave rectifying circuit connected to said second input signal line and having its second output end connected to said second end of said load capacitor;

a second reactor having its first end connected to a first output end of said second full-wave rectifying circuit;

a second rectifier diode having its anode electrode connected to a second end of said second reactor and its cathode electrode connected to said output end of said second main circuit, and a second switching element having its first main electrode connected to said second end of said second reactor and its second main electrode connected to said second end of said load capacitor, performing ON operation when a second control voltage applied to its control electrode is at an ON level and performing OFF operation when said second control voltage is at an OFF level, and said third main circuit comprises:

a third full-wave rectifying circuit connected to said third input signal line and having its second output end connected to said second end of said load capacitor;

a third reactor having its first end connected to a first output end of said third full-wave rectifying circuit;

a third rectifier diode having its anode electrode connected to a second end of said third reactor and its cathode electrode connected to said output end of said third main circuit, and a third switching element having its first main electrode connected to said second end of said third reactor and its second main electrode connected to said second end of said load capacitor, performing ON operation when a third control voltage applied to its control electrode is at an ON level and performing OFF operation when said third control voltage is at an OFF level, and wherein said negative feedback control circuit further comprises:

an eighth signal line having its one end connected to said one end of said fifth signal line and its other end connected to said control electrode of said second switching element, and shifting phase of said control voltage outputted from said comparator by 120 degrees and transferring said control voltage which has been shifted as said second control voltage, and a ninth signal line having its one end connected to said one end of said fifth signal line and its other end connected to said control electrode of said third switching element, shifting phase of said control voltage outputted from said comparator by 240 degrees and transferring said control voltage which has been shifted as said third control voltage.

8. The boosting active filter system according to claim 6, wherein said load is an inverter circuit.

9. The boosting active filter system according to claim 6, wherein said load is an AC servomotor.

10. The boosting active filter system according to claim 2, wherein said power supply is a given DC power supply.

11. A device for controlling a boosting active filter, wherein said boosting active filter receives a power-supply signal outputted from an external power supply and full-wave rectifies said power-supply signal in a full-wave rectifying circuit, and when a switching element is in an ON operation state, said boosting active filter passes the full-wave rectified current to a loop including a reactor, said switching element, a current detecting resistor, and said full-wave rectifying circuit, and when said switching element is in an OFF operation state, said boosting active filter passes said full-wave rectified current to a load capacitor connected to a load in parallel through said reactor and a rectifier diode, said control device comprising:

overvoltage detecting means for receiving a signal giving an output voltage supplied to said load, and making a first comparison between said output voltage and an overvoltage level which is higher than a set value of said output voltage by a given level to output an overvoltage detect signal from its output end when said output voltage rises to said overvoltage level, and negative feedback control means for receiving said output voltage, said overvoltage detect signal, and an activation command signal generated outside, wherein said negative feedback control means starts its operation in response to input of said activation command signal and maintains its ON operation state while said activation command signal is being inputted, said negative feedback control means controlling a duty factor of a control voltage to said switching element on the basis of negative feedback of said output voltage when said overvoltage detect signal is not provided as its input in said ON operation sate, and controlling said duty factor of said control voltage to 0% to force said switching element to stay in the OFF state when said overvoltage detect signal is provided as its input in said ON operation state.

12. The boosting active filter control device according to claim 11, wherein said overvoltage detecting means further makes a second comparison between a reset level lower than said overvoltage level and said output voltage subsequently to said first comparison, and maintains output of said overvoltage detect signal until said output voltage which has risen to said overvoltage level falls to said reset level and stops said output of said overvoltage detect signal when said output voltage reaches said reset level, and while said overvoltage detect signal is being provided as input, said negative feedback control means keeps controlling said duty factor of said control voltage at said 0% while staying in said ON operation state.

13. The boosting active filter control device according to claim 12, wherein said negative feedback control means comprises:

first resistor means having its one end connected to one end of said load;

second resistor means having its one end connected to an other end of said first resistor means, and variable DC power-supply means having its one end connected to an other end of said second resistor means and its other end grounded, and said negative feedback control means sets a voltage at said other end of said first resistor means to a negative feedback signal giving said output voltage to perform said negative feedback, controls said duty factor of said control voltage by said negative feedback, and can freely vary said set value of said output voltage by varying a voltage of said variable dc power-supply means, and wherein said overvoltage detecting means makes said first comparison by using said voltage at said other end of said first resistor means as said signal giving said output voltage, said given level in said first comparison being always set at a constant value.

14. The boosting active filter control device according to claim 13, wherein said reset level is set on the basis of a value lower than said voltage at said other end of said first resistor means obtained when said output voltage supplied to said load has a value equal to said set value.

15. A device controlling a boosting active filter, wherein said boosting active filter receives a power-supply signal outputted from an external power supply and full-wave rectifies said power-supply signal in a full-wave rectifying circuit, and when a switching element is in an ON operation state, said boosting active filter passes the full-wave rectified current to a loop including a reactor, said switching element, a current detecting resistor, and said full-wave rectifying circuit, and when said switching element is in an OFF operation state, said boosting active filter passes said full-wave rectified current to a load capacitor connected to a load in parallel through said reactor and a rectifier diode, said control device comprising:

an overvoltage detecting circuit receiving a signal giving an output voltage of said boosting active filter supplied to said load, making a first comparison between said output voltage and an overvoltage level which is higher than a set value of said output voltage by a given level and outputting an overvoltage detect signal from its output end when said output voltage rises to said overvoltage level, and further making a second comparison between a reset level lower than said overvoltage level and said output voltage subsequently to said first comparison and maintaining output of said overvoltage detect signal until said output voltage which has risen to said overvoltage level falls to said reset level and stopping said output of said overvoltage detect signal when said output voltage reaches said reset level, and a negative feedback control circuit controlling a duty factor of a control voltage to said switching element on the basis of negative feedback of said output voltage when said overvoltage detect signal is not provided as its input, controlling said duty factor of said control voltage to 0% to force said switching element into the OFF state when said overvoltage detect signal is provided as its input, and keeping said duty factor of said control voltage at said 0% while said overvoltage detect signal is being provided as its input.

16. The boosting active filter control device according to claim 15, wherein said negative feedback control circuit comprises:

a first signal line transferring said output voltage;

a voltage setting circuit outputting an output volt age set value signal which gives said set value of said output voltage of said boosting active filter as a given value;

a first differential amplifier circuit having its negative input end connected to an output end of said first signal line and its positive input end connected to an output end of said voltage set ting circuit;

a second signal line having its one end connected to a first output end of said full-wave rectifying circuit located on the side of said reactor, and transferring a full-wave rectified current signal which gives said full-wave rectified current;

a multiplier circuit having its input ends connected to an output end of said first differential amplifier circuit and an other end of said second signal line, and multiplying an output signal of said first differential amplifier circuit and said full-wave rectified current signal together;

a third signal line having its one end connected to one end of said current detecting resistor located on the side of said full-wave rectifying circuit;

a second differential amplifier circuit having its negative input end connected to an other end of said third signal line and its positive input end connected to an output end of said multiplier circuit;

a fourth signal line having its one end connected to an output end of said second differential amplifier circuit;

an oscillator generating a clock which is at a given frequency and has a given waveform having its valley voltage at a first level and its peak voltage at a second level;

a comparator having its first input end connected to an other end of said fourth signal line and its second input end connected to an output end of said oscillator, outputting said control voltage having said duty factor equal to said 0% when a signal at said other end of said fourth signal line is equal to said first level, outputting said control voltage having said duty factor equal to 100% when said signal at said other end of said fourth signal line is equal to said second level, and varying said duty factor in proportion to said signal at said other end of said fourth signal line when said signal at said other end of said fourth signal line is larger than said first level and smaller than said second level;

a fifth signal line having its one end connected to an output end of said comparator and its other end connected to a control electrode of said switching element, and a sixth signal line having its one end connected to said output end of said overvoltage detecting circuit and its other end connected to said output end of said second differential amplifier circuit, and wherein said overvoltage detecting circuit outputs said overvoltage detect signal at such a given level as to bring said signal at said other end of said fourth signal line to or below said first level.

17. The boosting active filter control device according to claim 15, wherein said negative feedback control circuit comprises:

a first resistor having its one end connected to one end of said load which corresponds to an output end of said boosting active filter;

a second resistor having its one end connected to an other end of said first resistor;

a control power supply connected to an other end of said second resistor and having a DC power-supply value capable of being variably set;

a first differential amplifier circuit having its negative input end connected to said other end of said first resistor, receiving a constant reference voltage at its positive input end, and comparing a level at said other end of said first resistor and said reference voltage to output a differential signal;

a multiplier circuit having a first input end connected to an output end of said first differential amplifier circuit and a second input end connected to a first output end of said full-wave rectifying circuit located on the side of said reactor through a third resistor, and multiplying an output signal of said first differential amplifier circuit and a full-wave rectified current signal giving said full-wave rectified current together;

a second differential amplifier circuit having its negative input end connected to a second output end of said full-wave rectifying circuit located on the side of said current detecting resistor and its positive input end connected to an output end of said multiplier circuit;

a second differential amplifier circuit output signal line having its one end connected to an output end of said second differential amplifier circuit;

an oscillator generating a clock which is at a given frequency and has a given waveform having its valley voltage at a first level and its peak voltage at a second level;

a comparator having its first input end connected to an other end of said second differential amplifier circuit output signal line and its second input end connected to an output end of said oscillator, outputting said control voltage having said duty factor equal to said 0% when a signal at said other end of said second differential amplifier circuit output signal line is equal to said first level, outputting said control voltage having said duty factor equal to 100% when said signal at said other end of said second differential amplifier circuit output signal line is equal to said second level, and varying said duty factor in proportion to said signal at said other end of said second differential amplifier circuit output signal line when said signal at said other end of said second differential amplifier circuit output signal line is larger than said first level and smaller than said second level;

a control signal output line having its one end connected to an output end of said comparator and its other end connected to a control electrode of said switching element, and an overvoltage detect signal line having its one end connected to said output end of said overvoltage detecting circuit and its other end connected to said output end of said second differential amplifier circuit, and wherein said overvoltage detecting circuit has its input end connected to said other end of said first resistor, and said overvoltage detecting circuit outputs said overvoltage detect signal at such a given level as to bring said signal at said other end of said second differential amplifier circuit output signal line to or below said first level.

18. The boosting active filter control device according to claim 17, wherein said output end of said first differential amplifier circuit is also connected to said other end of said overvoltage detect signal line.

* * * * *